(12) United States Patent
Abe et al.

(10) Patent No.: US 7,542,584 B2
(45) Date of Patent: Jun. 2, 2009

(54) IMAGE PROCESSING METHOD, IMAGE PROCESSING APPARATUS, PROGRAM AND RECORDING MEDIUM THAT CAN REDUCE IMAGE QUALITY DEGRADATION

(75) Inventors: Yasushi Abe, Kanagawa (JP); Takayuki Nishimura, Tottori (JP)

(73) Assignee: Ricoh Company, Ltd., Tokyo (JP)

( * ) Notice: Subject to any disclaimer, the term of this patent is extended or adjusted under 35 U.S.C. 154(b) by 691 days.

(21) Appl. No.: 11/061,276

(22) Filed: Feb. 18, 2005

(65) Prior Publication Data

US 2005/0180596 A1 Aug. 18, 2005

(30) Foreign Application Priority Data

Feb. 18, 2004 (JP) ............................. 2004-041022
Feb. 3, 2005 (JP) ............................. 2005-027807

(51) Int. Cl.
G06K 9/00 (2006.01)
G09C 3/00 (2006.01)
G09C 5/00 (2006.01)
H04K 1/02 (2006.01)
H04L 9/00 (2006.01)
G06F 7/04 (2006.01)

(52) U.S. Cl. ................... 382/100; 380/54; 380/283; 713/176; 726/26

(58) Field of Classification Search ............... None
See application file for complete search history.

(56) References Cited

U.S. PATENT DOCUMENTS

| 4,658,430 | A | * | 4/1987 | Anderson et al. | 382/297 |
|---|---|---|---|---|---|
| 5,859,920 | A | * | 1/1999 | Daly et al. | 382/115 |
| 6,359,985 | B1 | * | 3/2002 | Koch et al. | 380/54 |
| 6,473,516 | B1 | * | 10/2002 | Kawaguchi et al. | 382/100 |
| 6,901,862 | B2 | * | 6/2005 | Yamaguchi et al. | 101/483 |
| 2002/0015510 | A1 | | 2/2002 | Akashi | |
| 2004/0001610 | A1 | * | 1/2004 | Murakami | 382/100 |
| 2004/0005076 | A1 | * | 1/2004 | Hosaka et al. | 382/100 |
| 2005/0123168 | A1 | * | 6/2005 | Wendt | 382/100 |

OTHER PUBLICATIONS

"Shape-Preserving Data Embedding Algorithm for NURBS Curves and Surfaces", Proceedings of the International Conference on Computer Graphics, p. 180, Year of Publication: 1999, ISBN 0-7695-0185-0, Ryutarou Ohbuchi, Hiroshi Masuda, Masaki Aono.*

"Research Report on Digital Watermark Techniques", Japan Electronic Industry Development Association, Mar. 1993, 123 pages. A brief description is provided in the specification. A copy of the English language abstract is attached.

(Continued)

*Primary Examiner*—Vikkram Bali
*Assistant Examiner*—Michelle Entezari
(74) *Attorney, Agent, or Firm*—Blakely, Sokoloff, Taylor & Zafman LLP

(57) ABSTRACT

An image processing method includes the steps of: dividing digital content into run-lengths each including one or more consecutive pixels having an identical color; and embedding digital watermark information in the run-lengths while saving topology (first topology preservation law).

39 Claims, 13 Drawing Sheets

OTHER PUBLICATIONS

"Prevention of Illegal copying of Electronic Information (Venture company to lead in the illegal copy protection of digital data)", pp. 68-70 (9 pages including translation pages) of "Nikkei Business", Feb. 23, 1998. A brief description is provided in the specification. A copy of the English language translation is attached.

Matsui, K. et al: "Video-Steganography: How to Secretly Embed a Signature in a Picture", IMA Intellectual Property Project Proceedings, vol. 1, No. 1, 1994, pp. 187-206. XP000199949. *Abstract*, *p. 195*, *Figure 8*.

Tanaka, K. et al: "New Multiplexing Schemes of Two Documents for Standard Facsimile Transmission", Memoirs of the National Defense Academy, Japan, vol. 29, No. 2, Dec. 1989, pp. 215-230, XP008046977. ISSN: 0388-4112. *Abstract*, *Section 3.1*.

Fridrich, J. et al: "Lossless Data Embedding with File Size Preservation", Proceedings of the SPIE—The International Society for Optical Engineering SPIE-INT. Soc. Opt. Eng USA., vol. 5306, No. 1, Jan. 19, 2004, pp. 354-365, XP002328294. ISSN: 0277-786X. *Abstract*, *Section 2, 3.2*.

* cited by examiner

IMAGE PROCESSING METHOD, IMAGE PROCESSING APPARATUS, PROGRAM AND RECORDING MEDIUM THAT CAN REDUCE IMAGE QUALITY DEGRADATION

The present application claims priority to corresponding Japanese Application No. 2004-041022, filed on Feb. 18, 2004 and Japanese Application No. 2005-027807, filed Feb. 3, 2005, the entire contents of which are hereby incorporated by reference.

BACKGROUND OF THE INVENTION

1. Field of the Invention

The present invention generally relates to image processing methods, image processing apparatuses, programs, and recording media that embed digital watermarks in digital content by encoding, and detect copyright information and/or falsification in the process of decoding the digital watermarks embedded in the digital content.

2. Description of the Related Art

Digital information can be easily copied by, for example, computers, without being degraded. Conversely, digital information may be easily overwritten and/or falsified. Hence, with simple processes and/or operations, digital information is likely to be illegally copied and reused without permission, or may be partially altered such that the digital information cannot be used as evidence photography.

Methods for preventing such problems include a method called digital watermarking or data hiding. Digital watermarking is a method of adding information that is invisible when digital contents such as digital images are normally reproduced.

Methods for embedding digital watermarks may be broadly classified into the following two categories:

(1) Method for directly embedding into a sample value of content data (2) Method for embedding into a frequency component.

In the method (1), when processes such as compression are performed, embedded data are likely to be lost, but the processing workload is light. On the other hand, in the method (2), embedded data are not easily lost in processes such as compression, but the processing workloads of embedding and extracting are heavy.

It is difficult to apply the method (2) to digital watermarking in the cases where data are saved in data formats that are difficult to be expressed in gradation, such as binary images and color images that only allow use of specified colors. Thus, the method (1) is generally used for digital watermarking in such cases. As described below, the present invention is realized with the method (1).

Intended purposes of adding digital watermarks to digital contents include, for example: recording of copyright information; tracing of information of illegal copiers; recording of IP address history; prevention of illegal copying (invisible/high tolerance type); application to prevention of falsification (invisible/low tolerance type); authentication; secret communications; embedding of remarks and/or labels of digital contents (visible/invisible type, displaying owner); allowing for removal of watermarks (visible/invisible type, content distribution).

A method has been proposed to provide a camera with a mechanism for embedding the serial number of the camera and shooting date and time, and simultaneously creating an electronic signature when taking pictures (refer to "Research Report on Digital Watermark Techniques", Japan Electronic Industry Development Association, March, 1993, and 'Prevention of Illegal copying of Electronic Information', pp. 68-70 of "Nikkei Business", Feb. 23, 1998). Thereby, in addition to detection of falsification of evidence photography, it is possible to specify the camera used for taking pictures and confirm the date and time when the pictures were taken. Falsification may be detected only by electronic signature techniques. However, with the use of watermarking techniques, it is possible to specify the camera used for taking pictures and the date and time when the pictures were taken, which is more effective for preventing falsification. Additionally, by increasing the amount of information within embedded digital watermarks, the accuracy in specifying the falsified position is improved. Further, in terms of copyright protection, the more the embedded information of watermarks is, the easier the extraction of the information becomes when analyzing the embedded information, which contributes to the effectiveness.

However, embedding a digital watermark degrades digital content data in which the digital watermark is to be embedded. Thus, it is important to degrade image quality as little as possible even if the amount of embedded data is increased.

Meanwhile, in the case where a digital watermark is directly embedded in an image by taking advantage of the characteristic "human eyes detect noise in edge portions of the image less than noise in flat portions of the image", the digital watermark is generally embedded in the edge portions of the image. However, normally, in the image, the area of the edge portions is less than that of the flat portions. Thus, when the amount of information of a digital watermark to be embedded is large, the image quality is significantly degraded. Particularly, the information and/or meaning of an original image may be lost when degradation of the image quality is such that the outline of the image (e.g., ledger sheet, figure, or map) that is artificially created is excessively affected, or such that the framework of the image is divided or deleted.

That is, in order to improve performance in detecting falsification and/or extracting copyright information, it is preferable to increase the amount of information of an embedded watermark as much as possible while degrading the image quality as little as possible. However, the more the amount of information of an embedded watermark becomes, the higher the level of degradation of image quality becomes. In other words, there is a trade-off relationship between the amount of information of an embedded watermark and the level of degradation of image quality.

SUMMARY OF THE INVENTION

An image processing method, image processing apparatus, program and recording medium that can reduce image quality degradation are described. In one embodiment, the image processing method comprises dividing digital content into run-lengths when each includes one or more consecutive pixels having an identical color, and embedding digital watermark information in the run-lengths while saving topology (first topology preservation law).

DETAILED DESCRIPTION OF THE PREFERRED EMBODIMENTS

Figure 1:
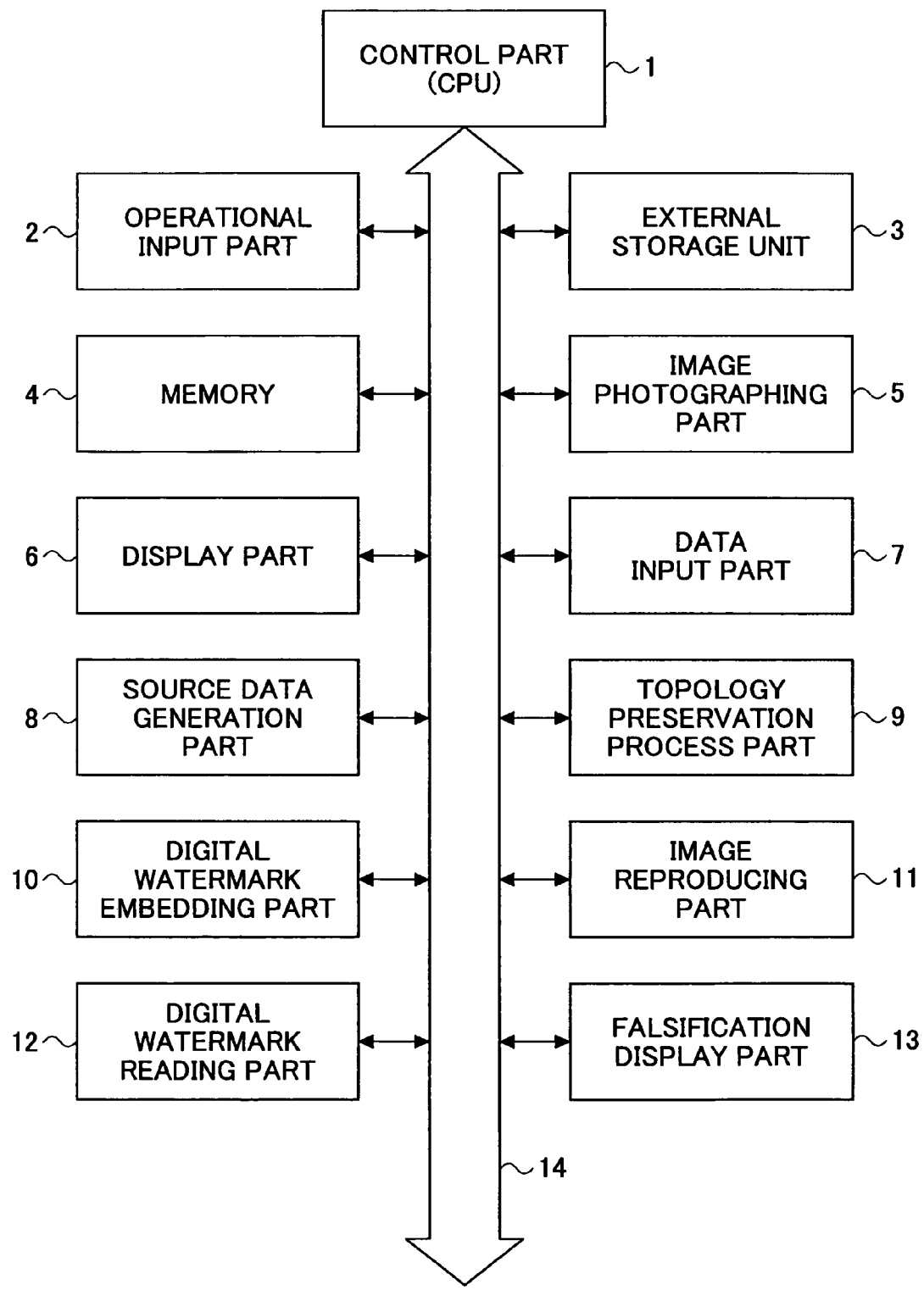
FIG. 1 is a schematic diagram showing a system structure according to one embodiment of the present invention.

Embodiments of the present invention comprise an improved and useful image processing method, image processing apparatus, program, and recording medium in which one or more of the above-mentioned problems are eliminated.

The present invention handles digital content such as information of still images, moving images, computer programs, and computer data. Particularly, the present invention provides techniques effective for digital watermark embedding processes in the cases where data are saved in data formats that are difficult to be expressed in gradation. Examples of such data include binary images and color images such as artificial images, which only allow use of specific colors (for example, expression in 256 colors; also referred to as limited colors or index colors).

Other and more specific embodiments of the present invention comprise an image processing method, an image processing apparatus, a program, and a recording medium that can embed a digital watermark in accordance with a topology conservation law of digital images while reducing image quality degradation.

One major characteristic of the present invention is to realize a code generation method (topology preservation law) that preserves topology of a digital image and significant edge shapes.

In order to achieve the above-mentioned embodiments, according to one aspect of the present invention, there is provided an image processing method that includes the steps of: dividing digital content into run-lengths each including one or more consecutive pixels having an identical color; and embedding digital watermark information in the run-lengths while saving topology (first topology preservation law).

Additionally, according to another aspect of the present invention, there is provided an image processing apparatus including: a dividing unit that divides digital content into run-lengths each including one or more consecutive pixels having an identical color; and a digital watermark embedding unit that embeds digital watermark information in the run-lengths while saving topology (first topology preservation law).

Additionally, according to another aspect of the present invention, there is provided a program for causing a computer to realize each of the steps of: dividing digital content into run-lengths each including one or more consecutive pixels having an identical color; and embedding digital watermark information in the run-lengths while saving topology (first topology preservation law).

Additionally, according to another aspect of the present invention, there is provided a computer-readable recording medium recording thereon a program for causing a computer to realize each of the steps of: dividing digital content into run-lengths each including one or more consecutive pixels having an identical color; and embedding digital watermark information in the run-lengths while saving topology (first topology preservation law).

According to one embodiment of the present invention, it is possible to embed a digital watermark in a portion including consecutive pixels of an identical color and with respect to all pixel colors in an image, while reducing image quality degradation.

Other embodiments, features and advantages of the present invention will become more apparent from the following detailed description when read in conjunction with the following drawings.

A description is given of a method for expressing the information value of a digital watermark according to the present invention. The information value of a digital watermark is indicated by the run-length. For example, in the case where digital watermark information is indicated by the parity of a horizontal run-length (e.g., when the run-length is an even value, digital watermark 1 bit information is OFF, and when the run-length is an odd value, digital watermark 1 bit information is ON), embedding a digital watermark may change the size of the original run-length from +1 to −1 pixel. The following methods A through C represent methods for determining a changed value.

A. Method for Changing the Original Run-Length by −1 Pixel

This method is applied to the case where "1-bit information value to be embedded does not match the parity of an original run-length", so that both match. However, when the original run-length value is 1, the method A cannot be applied, and the following method C is applied.

B. Method for Changing the Original Run-Length by ±0 (No Change)

This method is applied to the case where "1-bit information value to be embedded matches the parity of the original run-length, and thus it is unnecessary to change the original run-length".

C. Method for Changing the Original Run-Length by +1

This method is applied to the case where "1-bit information value to be embedded does not match the parity of the original run-length", so that both match. However, this method cannot be applied when the run-length values on both adjacent sides (left and right sides) are 1. In such a case, the above-mentioned method A is applied.

Either Method A or C may be applied in the cases other than the exceptions given in the above descriptions of Methods A and C. However, in order to avoid degradation of the shape of an image as much as possible, Methods A and C are used appropriately in accordance with the following determination methods (A) and (B).

It should be noted that the following determination methods are based on the characteristics that "even if the run-length value of a specific run (hereinafter referred to as "relevant run") is changed, from the need to reduce degradation of image quality, the run-length adjacent to the changed run-length (either the left or right side of the relevant run) also needs to be changed (to be changed by an increase or decrease that reverses the sign of the changed value of the relevant run)".

(A) The above-mentioned method A is applied to the cases where the original run-length value is larger than both adjacent run-length values (when the original run-length value is the greatest value among three values, i.e., the original run-length value and both adjacent run-length values). In addition, the pixel to be changed is in the boundary portion having a larger run-length value than the adjacent run-length values (one pixel in the boundary portion is changed to the pixel value of the adjacent run).

This represents that, when (Ll<Lt) and (Lr<Lt), 1 is subtracted from Lt, and 1 is added to Ll or Lr, where, in the list of run-lengths of an original image:

Ll . . . run-length to the left of target run ("l" represents "left");

Lt . . . run-length of target run ("t" represents "target"); and

Lr . . . run-length to the right of target run ("or" represents "right").

A digital watermark is represented by the parity of Lt. Ll or Lr is used for adjustment such that (Ll+Lt)=constant or (Lt+Lr)=constant, respectively.

(B) Method C is applied to the cases other than the cases described in (A) (when the original run-length value is not the largest among the three values, i.e., the original run-length value and both adjacent run-length values). In addition, the pixel to be changed is in the boundary portion having a larger run-length value than the adjacent run-length values (one pixel in the boundary portion of the adjacent run is changed to the pixel value of the relevant run).

This represents that, when (Lt<Ll) or (Lt<Lr), 1 is added to Lt and 1 is subtracted from Ll or Lr.

It should be noted that variable digital watermark information cannot be embedded even for 1 bit in the following two cases, which are extreme cases for a series of pixels into which a digital watermark is to be embedded.

(1) Case where all run-length values are 1 (many natural images (photographs) correspond to this case)

(2) Case where all pixels have the same color (having only a single set of run-length values)

A method for preserving topology of a digital image according to the present invention divides the image into blocks and realizes a unique topology preserving function for each of the blocks.

The basic idea of topology preserving (unchangeable rule) is "a same color pixel region (run-length), which is formed by consecutive pixels having the same color, prohibits the run-length from being divided such that one or more pixels having another color are inserted therein, prohibits new formation of a nested region to be embedded therein, and prohibits deletion of the run-length".

The advantages of dividing an image into blocks are as follows: management in units of blocks becomes simple by dividing a place to embed information; and in an environment allowing parallel processing, a watermark embedding process and a watermark extracting process can be performed in parallel for each block, which speeds up the processing.

Methods for dividing an image into blocks are as follows:

(1) Linear (One-Dimensional Space) Block (1×n) Pixels

This block is a series of pixels having the same color and organized into data called run-length. There are horizontal run-lengths and vertical run-lengths. However, hereinafter, a description is given on the assumption that a run-length is horizontal and linear. In this case, the run-length is changed in the horizontal (right and left) directions, and a watermark value is indicated by the parity of a value. Further, "n" is a power of two. The same applies to the following description.

In the case where topology preservation is performed on the block boundary portion between a block and the left or right adjacent block, when the boundary portion has the same color as that of the adjacent block boundary, the run-length in the block boundary may be set to 0. However, it is impossible to simultaneously set, to 0, the run-length in the adjacent boundary portion and having the same color (for topology preservation across the block boundary).

(2) (n×n) Rectangular Block

In this case, the above-mentioned preservation of run-length may be assumed, or topology may be preserved in a two-dimensional region irrespective of preservation of run-length.

(3) Independent Region of an Identical Color Surrounded by Pixels Having the Same Color Since management can be performed for each region surrounded by the outline of an identical color, it is highly effective for reducing image quality degradation due to topology preservation. However, when the shape of a boundary portion is indefinite, processing becomes complex and it is difficult to perform high-speed processing.

The topology preservation function is handled as follows in block boundaries:

(1) Method for Preserving Topology by Being Limited to Pixels within Each Block

In this method, processing is independently performed for each block. Thus, processing in units of blocks can be performed in parallel. However, the image quality in block boundary portions is somewhat degraded.

(2) Method for Preserving Topology in Consideration of Continuity of Pixel Values from Block Boundary Portion to the Outside of the Block Boundary Portion In this method, independent processing for each block is partially regulated. Thus, there is a probability that processing in units of blocks may not be performed in parallel. However, the method is effective for reducing image quality degradation in block boundary portions.

(3) Method for Preserving Significant Edge Shape in a Digital Image

In artificial images such as ledger sheets, figures, and maps, a lot of horizontal lines, vertical lines, and oblique lines are highly important in the images. Additionally, the pixels of a CCD or a display device, corresponding to the pixels of a photographing device, are arranged in a horizontal direction or a vertical direction. Thus, based on the judgment that such characteristics are important, a digital watermark is embedded by changing pixel values such that a series of consecutive pixels having identical colors do not damage the characteristics of horizontal lines, vertical lines, or oblique lines (having a step-like shape when an image is expanded).

A detailed description is given of embodiments of the present invention with reference to the drawings.

FIG. 1 shows a system structure according to one embodiment of the present invention. More specifically, FIG. 1 shows an exemplary structure of an encoding/decoding apparatus, which implements a coding (embedding of a digital watermark)/decoding (reading a digital watermark and detecting falsification) method for digital images.

The encoding/decoding apparatus includes a control unit (CPU) 1, an operational input unit (keyboard, mouse) 2, an external storage unit 3, a memory 4, an image photographing unit 5, a display unit 6, a data input unit 7 for inputting arbitrary data from outside, a source data generation unit 8 for embedding digital watermarks, a topology preservation process unit 9, a digital watermark embedding unit 10, an image reproducing unit 11, a digital watermark reading unit 12, a falsification (inverting) display unit 13 for displaying detected falsification, and a bus 14. It should be noted that illustration of interfaces required between each of the above-mentioned units (or devices) and the bus 14 are omitted.

The control unit 1 is a microcomputer (hereinafter simply referred to as "CPU", though it may be formed by, for example, CPU, ROM and RAM) that controls operations and functions of the apparatus. Functions of each of the image photographing unit 5, the data input unit 7, the source data generation unit 8, the topology preservation process unit 9, and digital watermark embedding unit 10, the image reproducing unit 11, the digital watermark reading unit 12, and the falsification display unit 13 may be realized by software processing by the CPU. An image photographing process is performed by the image photographing unit 5, the data input unit 7, the source data generation unit 8, the topology preservation process unit 9, and digital watermark embedding unit 10. An image reproducing process is performed by the image reproducing unit 11, the digital watermark reading unit 12, and the falsification display unit 13.

The operational input unit 2 is for inputting various operational instructions, function selection instructions, edited data and the like. The operational input unit 2 may be, for example, a keyboard, a mouse, or a touch panel. More specifically, the operational input unit 2 is used for inputting a secret key when encrypting image data to which digital watermark data are embedded or when reading an encrypted digital watermark.

The operational input unit 2 also includes functions as display selection means, and can change the display state of the display unit 6 to a desired display state. For example, with a key operation, a digital watermark reading result may be displayed by superposing input image data thereon, or only one of them may be selected and displayed.

The external storage unit 3 is a storage medium that can be ejected from the apparatus and stores, for example, image data photographed by the image photographing unit 5, compressed data in which a digital watermark is embedded by the digital watermark embedding unit 10, and data of a falsified portion detected by the digital watermark reading unit 12. The external storage unit 3 may be, for example, a flexible disk (FD) or a magneto optical disk (MOD). Additionally, the external storage unit 3 also functions as a medium that records program software to be implemented by the control unit 1.

The memory 4 is a memory storing, for example, image data read by the image photographing unit 5 and image data generated by reading and decompressing, by the image reproducing unit 11, saved data in which a digital watermark is embedded. The memory 4 may be, for example, a large-capacity RAM or a hard disk.

The image photographing unit 5 is image data inputting means for scanning, for example, a photograph or a ledger sheet that is set, reading the image thereof, and inputting the image data. The image photographing unit 5 may be, for example, a known image scanner or digital camera including an image sensor such as a scanning optical system and a CCD and a drive circuit therefor.

The data input unit 7 is means for inputting: source information for embedding supplementary information of digital contents as a digital watermark; and embedded information for falsification detection and copyright protection. Input data are stored in the memory 4 to be sent to the source data generation unit 8.

The source data generation unit 8 encrypts or encodes the data that are input by the data input unit 7. After processing, the data are stored in the memory 4 to be sent to the digital watermark embedding unit 10.

The digital watermark embedding unit 10 performs a process of embedding, as a digital watermark, the data that are input by the data input unit 7, encoded (encrypted) by the source data generation unit 8, and stored in the memory 4.

Figure 2A:
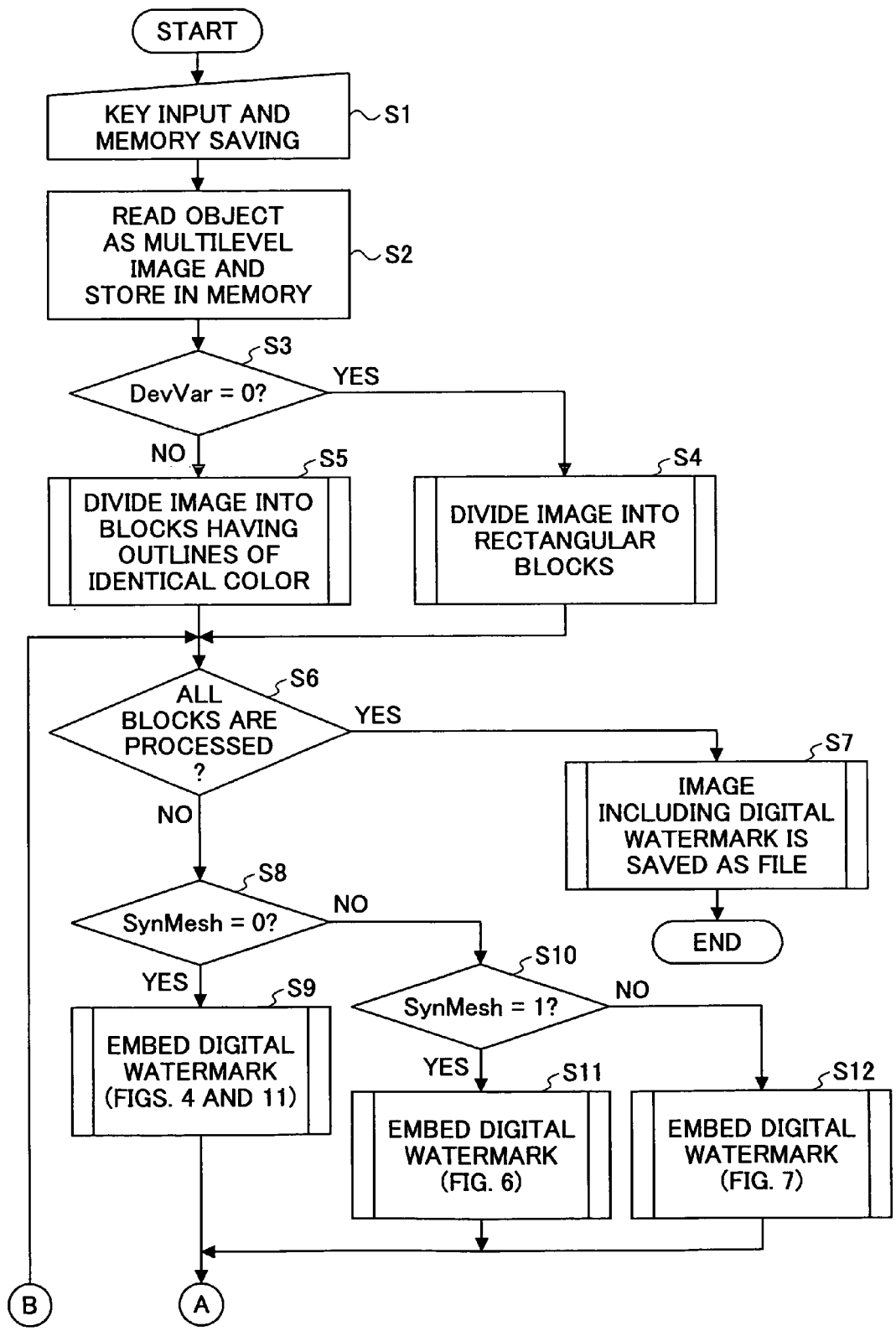
FIGS. 2A and 2B show a flowchart for illustrating a process for embedding digital watermark information.
Figure 2B:
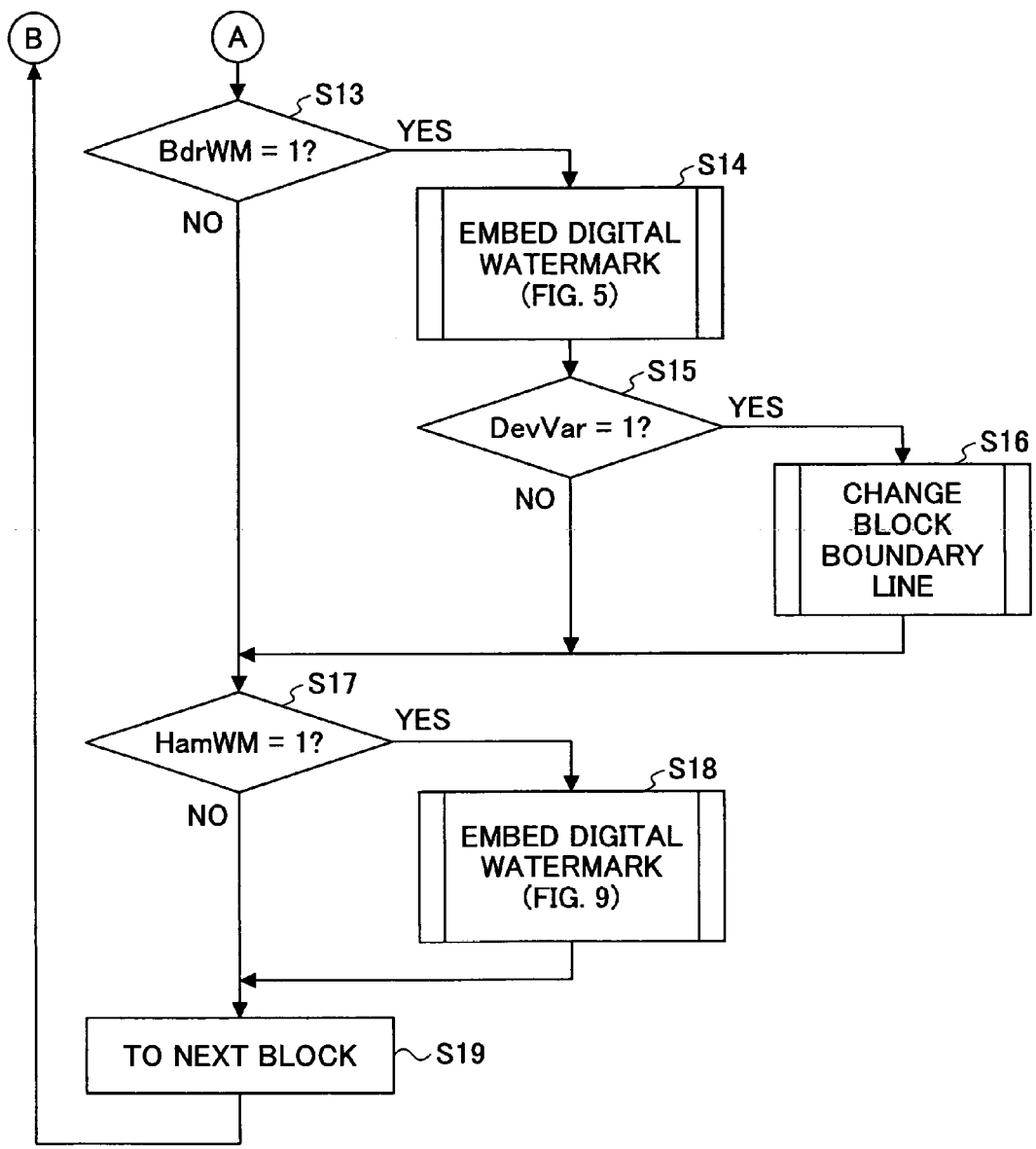

In addition, the digital watermark embedding unit 10 divides an original image into blocks when embedding a digital watermark. The digital watermark embedding unit 10 also performs a process of converting the entire image into a list of runs according to a method of processing a series of consecutive (in a horizontal direction or a vertical direction) pixels of an identical color as a single run (run-length). As described below, FIGS. 2A and 2B show a flowchart for illustrating a process of embedding a digital watermark at the time of image photographing.

The topology preservation process unit 9 controls, in the digital watermark embedding unit 10, the position to embed, in digital contents, the data generated by the source data generation unit 8 such that image quality degradation is reduced as much as possible.

For example, in the case where a digital watermark is embedded under the condition where neutral colors (fuzzy colors, such as gradation) cannot be expressed because the number of available colors is limited, it is possible to embed the digital watermark only in portions suitable for reducing image quality degradation according to an embedding method capable of preserving selected topology. Examples of such a case include artificial images such as documents, drawings, illustrations (cartoon), and maps. A detailed description of the process in the topology preservation process unit 9 is given with reference to FIGS. 4 through 10.

The image reproducing unit 11 performs control for reading data that includes a digital watermark embedded by the digital watermark embedding unit 10 and is saved in, for example, the external storage unit 3. The read image is stored in the memory 4.

The digital watermark reading unit 12 reads a digital watermark from the image data that are reproduced from the memory 4 by the image reproducing unit 11 and embedding therein the digital watermark. Depending on whether the digital watermark can be read, the digital watermark reading unit 12 determines whether the image is falsified and/or whether copyright protection information is valid.

Figure 3A:
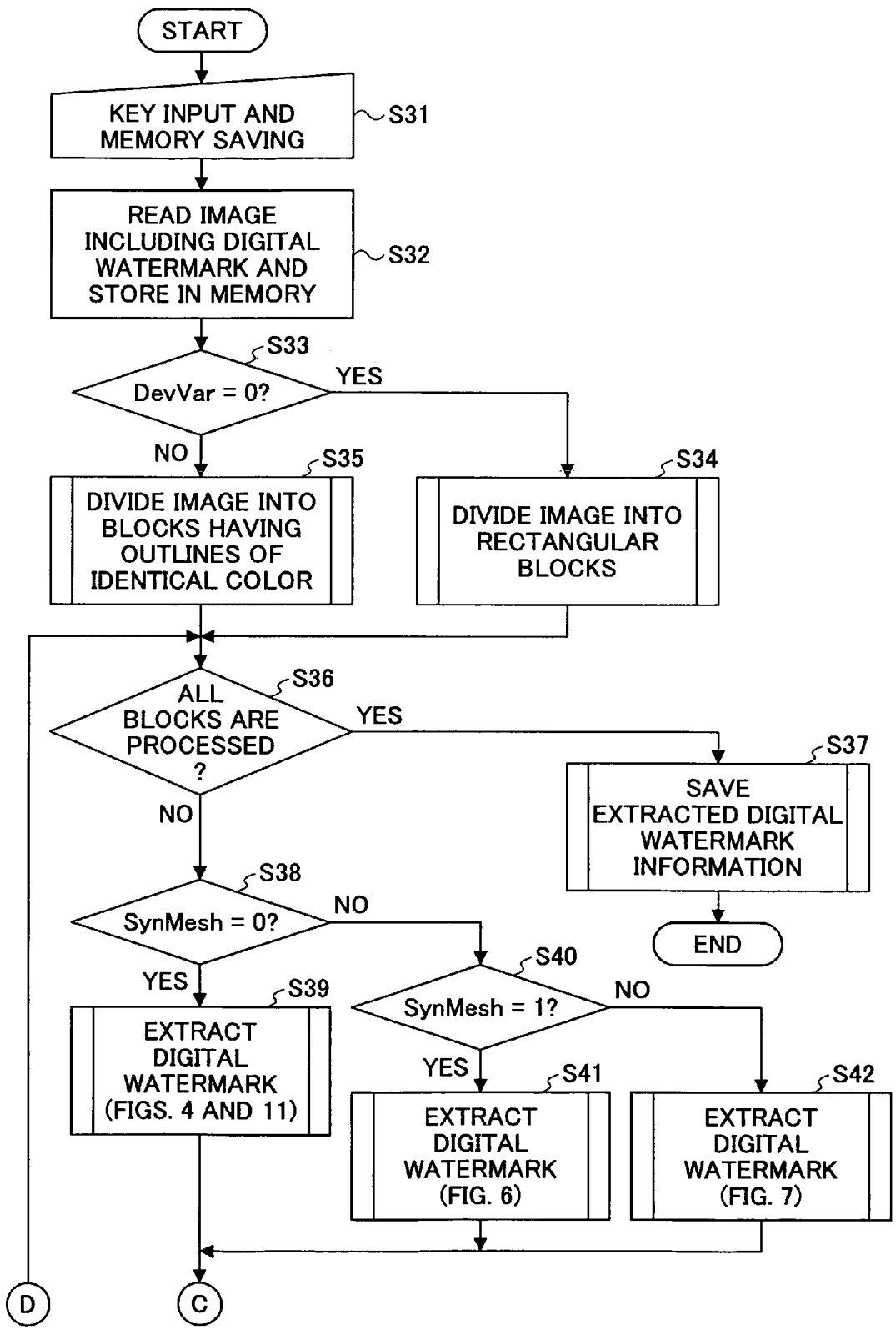
FIGS. 3A and 3B show a flowchart for illustrating a process for extracting digital watermark information.
Figure 3B:
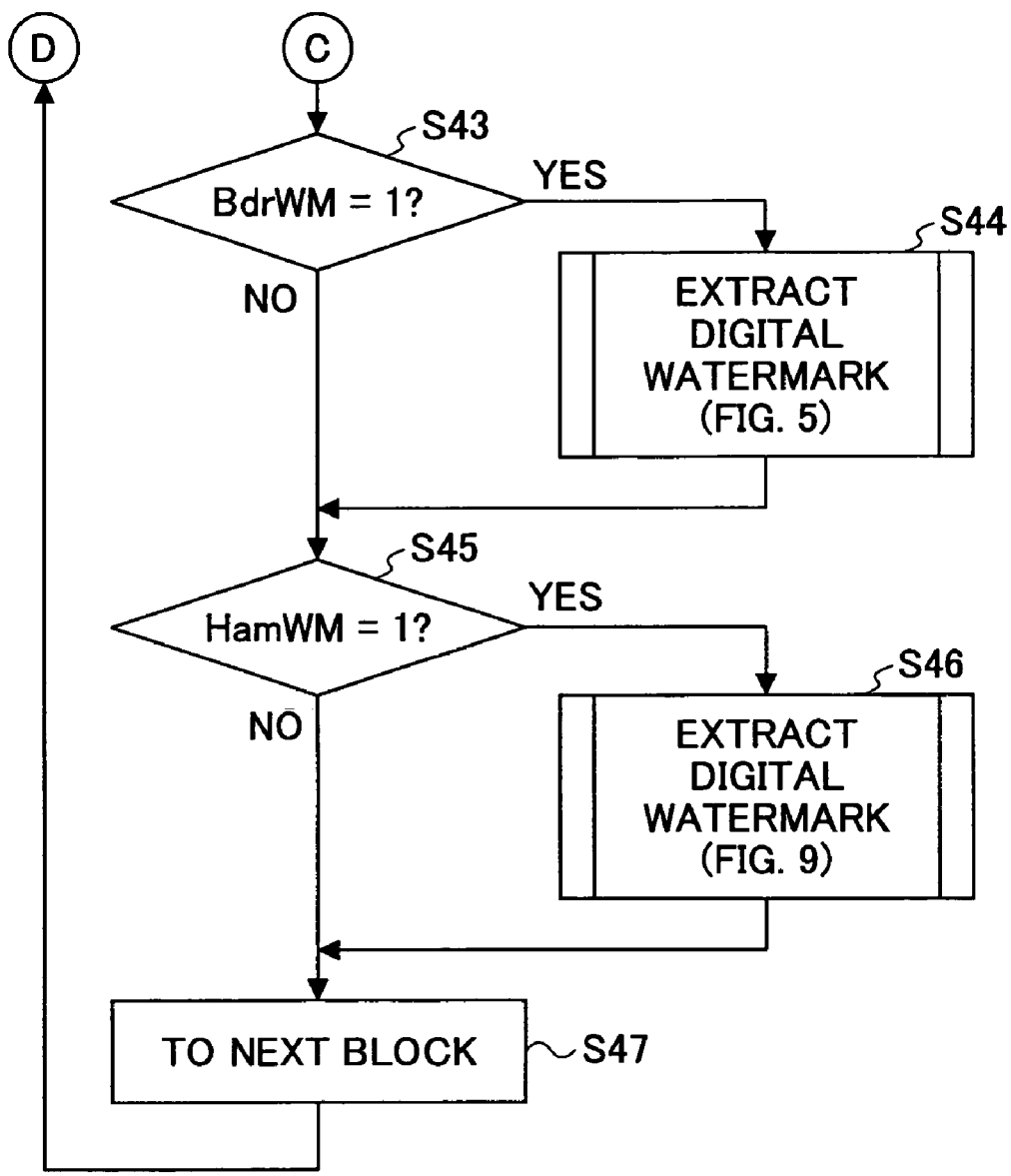

Additionally, prior to the digital watermark reading process, the digital watermark reading unit 12 divides the image embedding therein a digital watermark into blocks. The digital watermark reading unit 12 also performs a process of converting the entire image into a list of runs according to the method of processing a series of consecutive (in a horizontal direction or a vertical direction) pixels of an identical color as a single run (run-length). As described below, FIGS. 3A and 3B show a flowchart for illustrating a process of extracting digital watermark information when reproducing an image.

When it is determined that there is falsification as a result of reading by the digital watermark reading unit 12, the falsification display unit 13 displays the corresponding region by reversing display and/or filling the region with black color.

Figure 4A:
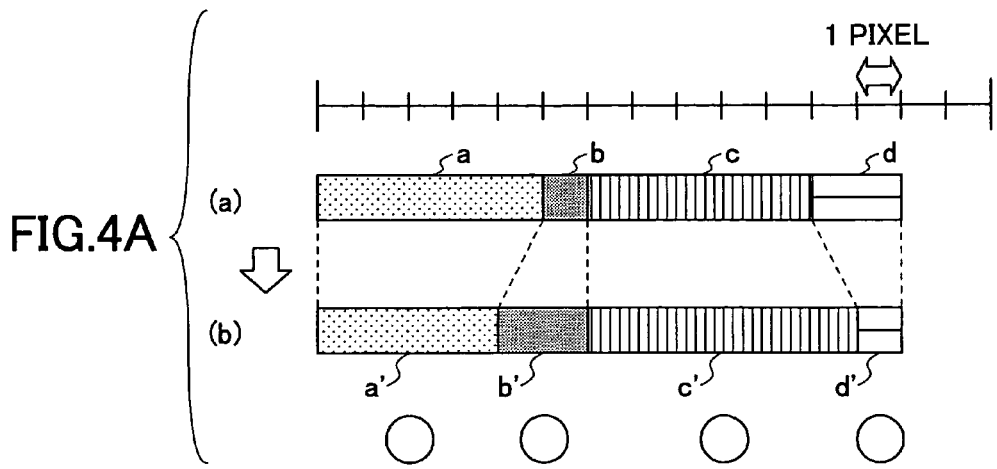
FIG. 4 is a diagram for illustrating digital watermark embedding according to a first embodiment.
Figure 4B:
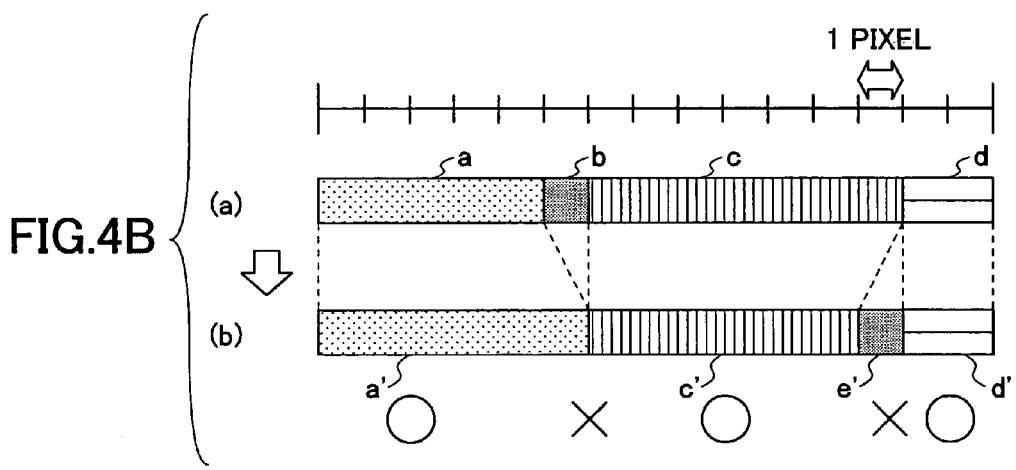
Figure 4C:
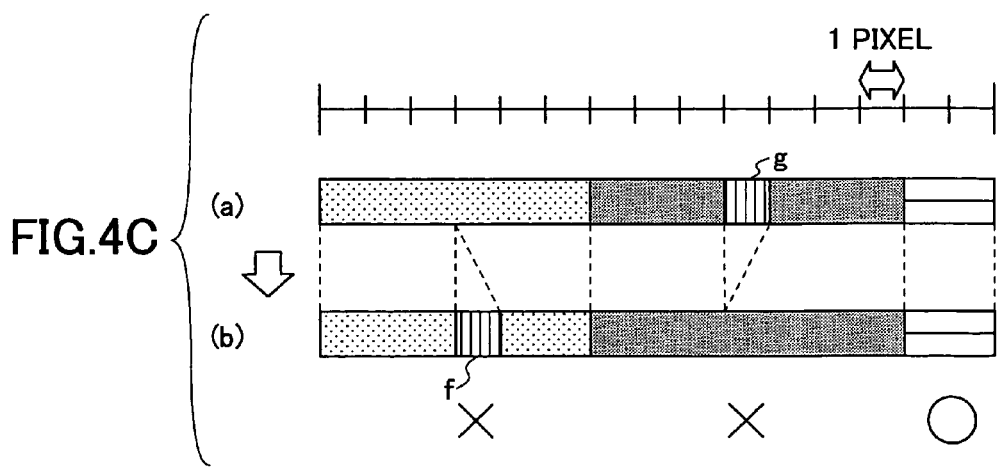

FIGS. 4A, 4B and 4C are diagrams for illustrating digital watermark embedding according to a first embodiment of the present invention. Referring to FIGS. 4A, 4B and 4C, a description is given of topology preservation rules in the case of embedding a digital watermark in the same line.

In FIG. 4A, (a) represents an original image, (b) represents the image embedding therein a digital watermark, and circles (◯) shown in the bottom of the figure indicate whether a topology conservation law is satisfied (◯ indicates "YES"). FIG. 4A-(a) represents a unit of run-length of image data of one line quantized by, for example, 8 bits. That is, the run-length shown in FIG. 4A-(a) consists of run-lengths of four kinds of colors, i.e., a run-length a (e.g., having the length of 5 pixels and each pixel value is 100), a run-length b (e.g., having the length of 1 pixel and the pixel value is 0), a run-length c (e.g., having the length of 5 pixels and each pixel value is 255), and a run-length d (the length of 2 pixels and each pixel value is 50). It should be noted that run-length information is saved in blocks not shown in the figure.

FIG. 4 shows a case where a digital watermark is embedded without deleting a run-length (corresponding to making a run-length 0) or newly adding a run-length (newly creating run-length information having a value equal to or more than 1) so that the topology in an identical line is not changed.

It is assumed that bit 0 is assigned to a run-length having an even-numbered length, and bit 1 is assigned to a run-length having an odd-numbered length.

Then, in the case shown in FIG. 4A, since digital watermark information to be embedded is "0001", and the alignment of run-lengths of the original image (FIG. 4-(a)) is "5: odd number"→"1: odd number"→"5: odd number"→"2: even number", the four consecutive run-lengths of the target run are changed by embedding the digital watermark information.

In other words, in FIG. 4A-(b), the run-length a, having a length of five pixels, is decreased by a length of one pixel to be a run-length a' having a length of four pixels. The run-length b, having a length of one pixel, is increased by a length of one pixel to be a run-length b' having a length of two pixels. The run-length c, having a length of five pixels, is increased by a length of one pixel to be a run-length c' having a length of six pixels. The run-length d, having a length of two pixels, is decreased by a length of one pixel to be a run-length d' having a length of one pixel. In the aforementioned manner, the image (b), preserving the topology, is generated from the original image (a). The run-lengths of the image (b) are: a'=4; b'=2; c'=6; and d'=1. When bit 0 is assigned to a run-length having an even-numbered length, and bit 1 is assigned to a run-length having an odd-numbered length, the image (b), embedding therein the digital watermark information "0001", is generated. It should be noted that the number of pixels to be increased or decreased is up to one pixel so as to reduce degradation of image quality.

FIG. 4B shows the case where topology is not preserved. In FIG. 4B, (a) represents an original image, (b) represents the image embedding therein a digital watermark, and circles (○) and crosses (X) shown in the bottom of the figure indicate whether a topology conservation law is satisfied (○ indicates "YES" and X indicates "NO"). FIG. 4B shows the case where there is an excess or deficiency in a run-length of an identical color in the same line. The run-lengths of the original image (a) in FIG. 4B are same as those of the original image (a) in FIG. 4A (that is, both original images (a) have the order: "odd number"→"odd number"→"odd number"→"even number" from the left to right). In FIG. 4B, (b) represents the image in which a digital watermark is embedded by increasing the run-length a by one pixel and decreasing the run-length c by one pixel. Since the run-length b is deleted and a run-length e' is newly created, the topology is not preserved, and the image (b), embedding therein the digital watermark, is determined to be invalid.

Here, "the case where there is an excess or deficiency in a run-length of an identical color in the same line" is as follows. As for corresponding relationship between the runs of the original image (a) and those of the image (b) in FIG. 4B, there is disagreement (portions indicated by crosses (X) in FIG. 4B). In addition, referring to FIG. 4C, as for corresponding relationship between the runs of an original image (a) and those of an image (b) embedding therein a digital watermark, there also is disagreement. Thus, FIG. 4C shows another example of "the case where there is an excess or deficiency in a run-length of an identical color in the same line".

On the other hand, there is a match between the corresponding relationship between the runs of the original image (a) and those of the image (b) in FIG. 4A. That is, as indicated by the circles (○) in FIG. 4A, the alignment of the colors indicated by the runs are the same between the images (a) and (b). Also, the number of runs is not changed between the images (a) and (b). Only the length of each run is changed between the images (a) and (b).

A description is given of how to determine whether a certain case corresponds to "the case where there is an excess or deficiency in a run-length of an identical color in the same line".

Once an image embedding a digital watermark is generated, the original image is discarded (deleted) in many cases. Thus, it is possible to positively determine whether there is an excess or deficiency in a run-length of an identical color only at the time of embedding the digital watermark. In this case, normally, the image embedding the digital watermark is used as a new original image. To be precise, the new original image is different from the original image, but the new original image includes additional information as hidden information while maintaining the original functions of the original image.

The processing method in embedding a digital watermark corresponds to step 9 of FIG. 2A. The processing method may be realized, for example, as follows.

Processing Method

Pixels are processed one by one from the leftmost pixel toward the right, while analyzing an original image.

i) Method for Determining the End of Run (1) If the pixel value of a target pixel in which a digital watermark is to be embedded is the same as the pixel value of the left adjacent pixel in the same line, it is determined that the target pixel and the left adjacent pixel are in the middle of a run.

(2) If the pixel value of the target pixel is different from the pixel value of the left adjacent pixel in the same line, it is determined that the end (break) of a run exists between the target pixel and the left adjacent pixel.

ii) Method for Adjusting Length of Run

The position of the end of the run described in the above item i)-(2) is moved. For example, moving the right end of a target run to the left for one pixel corresponds to the change from the run a to the run a', which are represented by (a) and (b) in FIG. 4A, respectively. The rightmost pixel forming the run a is changed to the pixel forming the right adjacent run b.

In this case, when one end is moved (e.g., for one pixel to the left or right), the run-lengths on both sides of the end are simultaneously changed (in FIG. 4A, a→a' and b→b').

A further detailed description of the above-mentioned processing method is given later.

FIG. 4C also shows a case where topology is not preserved. More specifically, FIG. 4C shows the case where a new run-length is inserted or deleted in a run-length of an identical color in the same line. In FIG. 4C, (a) represents an original image, (b) represents the image embedding therein a digital watermark, and circles (○) and crosses (X) indicate whether a topology conservation law is satisfied (○ indicates "YES" and X indicates "NO").

Referring to the image (b) of FIG. 4C, by embedding the digital watermark, a run-length f is newly created (inserted) and a run-length g is deleted. As a result, the topology is not preserved. Thus, the digital watermark in the image (b) of FIG. 4C is determined to be invalid.

Figure 5:
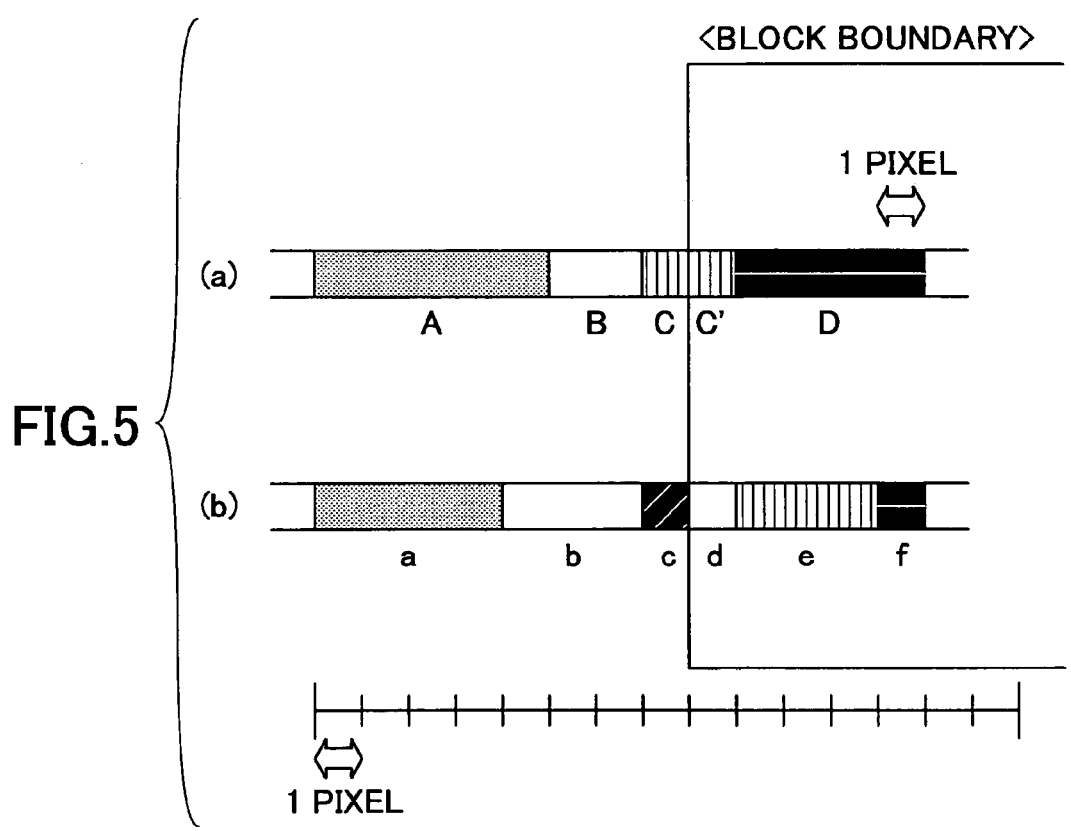
FIG. 5 is a diagram for illustrating digital watermark embedding according to a second embodiment.

FIG. 5 is a diagram for illustrating digital watermark embedding according to a second embodiment. Referring to FIG. 5, a description is given of a digital watermark embedding method that preserves topology in block boundary portions.

In the case where a block boundary portion exists between run-lengths C and C' (each having a length of one pixel) of Line 1 (indicated by (a) in FIG. 5) of an original image, since the run-lengths C and C' are of an identical color, even if one of the run-lengths C and C' is deleted, the topology is preserved and a valid digital watermark embedding process may be performed. One of the run-lengths C and C' may be deleted by extending a run-length B for one pixel to delete the run-length C or by extending a run-length D for one pixel to delete the run-length C'. Alternatively, a process may be performed that allows extension of the run-length C or C' for one pixel without performing the above-mentioned deletion of the run-length C or C' by not assuming the run-lengths C and C' are of an identical color even if they are (not making the continuity valid).

In the case where a block boundary portion exists between run-lengths c and d (each having a length of one pixel) of Line 2 (indicated by (b) in FIG. 5) of the original image, since the run-lengths c and d do not have an identical color, neither of run-lengths c and b may be deleted. The run-length c may be extended for one pixel toward the run-length d, and the run-length d may be extended for one pixel toward a run-length e.

Figure 6:
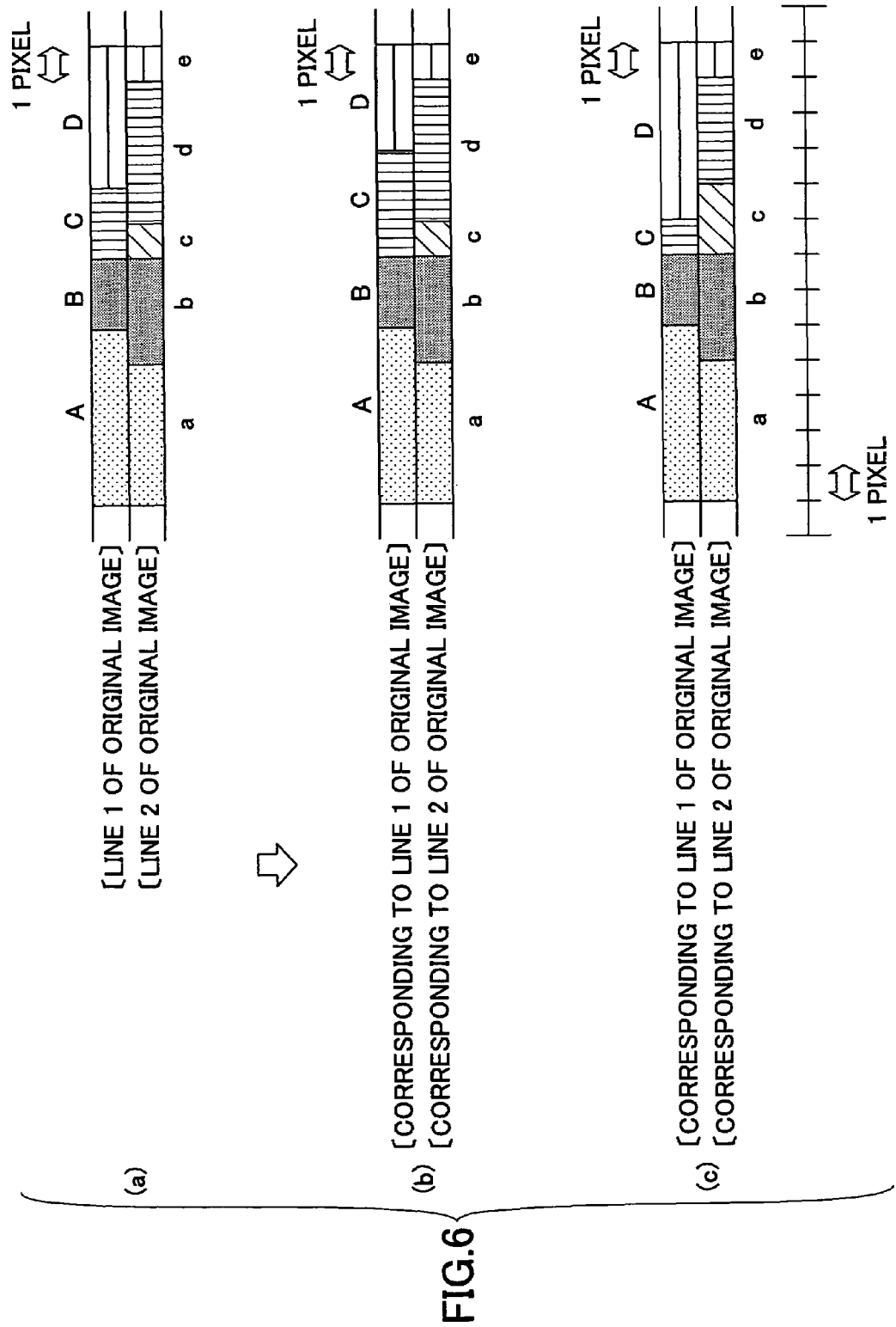
FIG. 6 is a diagram for illustrating digital watermark embedding according to a third embodiment.

FIG. 6 is a diagram for illustrating digital watermark embedding according to a third embodiment. Referring to FIG. 6, a description is given of a digital watermark embedding method that preserves topology between the adjacent lines stacked on one another. In FIG. 6, (a) represents the original images of two lines, i.e., Line 1 and Line 2, and (b) represents a case where a digital watermark is valid. Although the run-length C of Line 1 is extended for one pixel, the continuity between the run-length C of the Line 1 and the run-length d of Line 2 is maintained (the topology is preserved). It should be noted that, in FIG. 6, the lengths of the run-lengths A, B, a, b, c and e are not changed for simplicity of explanation.

On the other hand, (c) represents the case where the run-length c of Line 2 and the run-length D of Line 1 are extended for one pixel. In this case, the run-lengths C and d are not continuous, which is different from the original image (a). Thus, the topology is not preserved, and the process is determined to be invalid.

Figure 7:
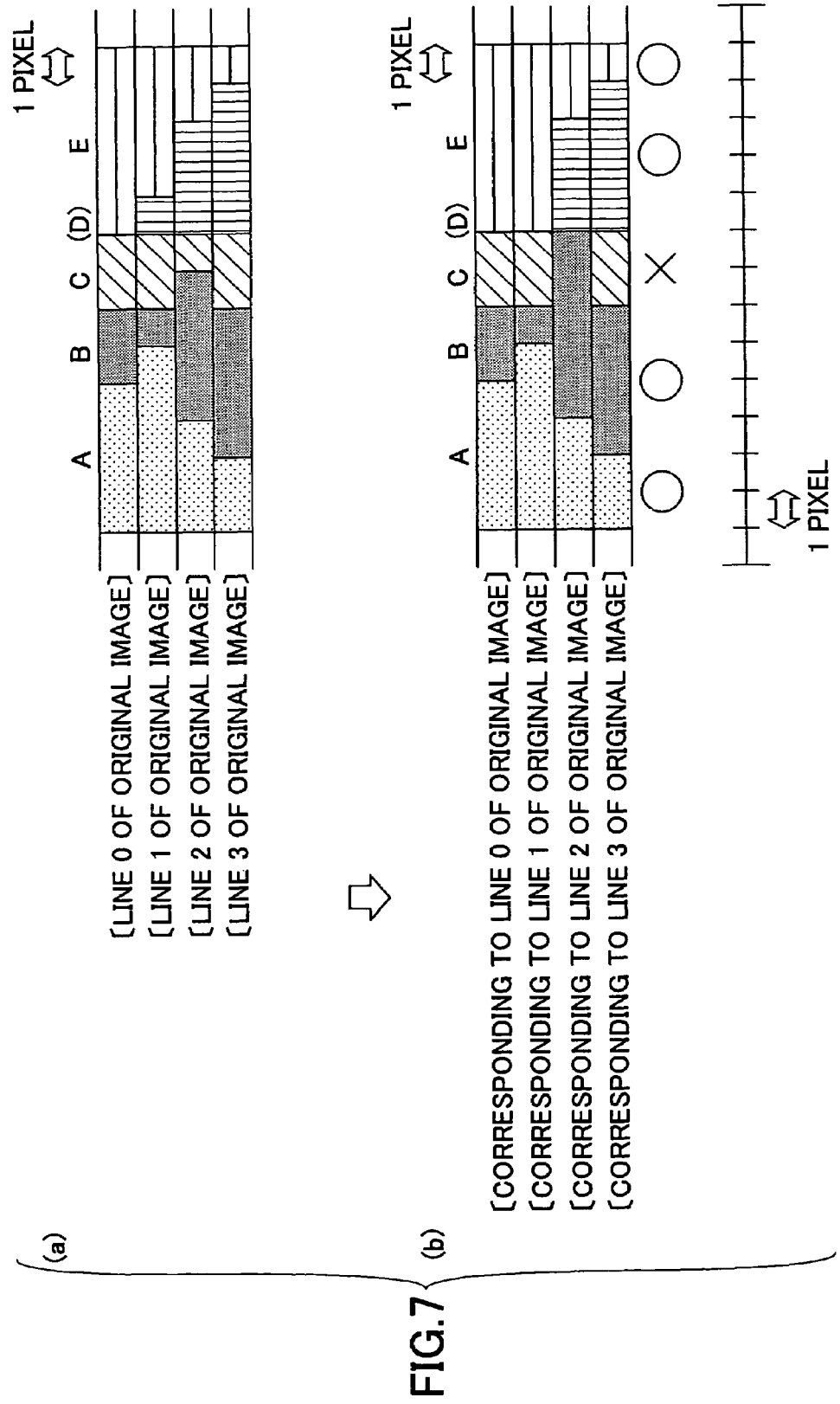
FIG. 7 is a diagram for illustrating digital watermark embedding according to a fourth embodiment.

FIG. 7 is a diagram for illustrating digital watermark embedding according to a fourth embodiment. Referring to FIG. 7, a description is given of a method for embedding a digital watermark while preserving topology between adjacent lines stacked on one another. FIG. 7 shows a case of four adjacent lines. In FIG. 7, (a) represents an original image, (b) represents the image embedding therein a digital watermark, and circles (○) and crosses (X) shown in the bottom of the figure indicate validity and invalidity, respectively. Referring to the image (b), since the run-length B of Line 2 is expanded for one pixel, run-lengths C become different from those of the original image. The continuity among run-lengths D is maintained (topology is preserved). However, the continuity of the run-lengths C is broken by Line 2. Thus, the topology is not preserved, and the process is determined to be invalid.

Figure 8:
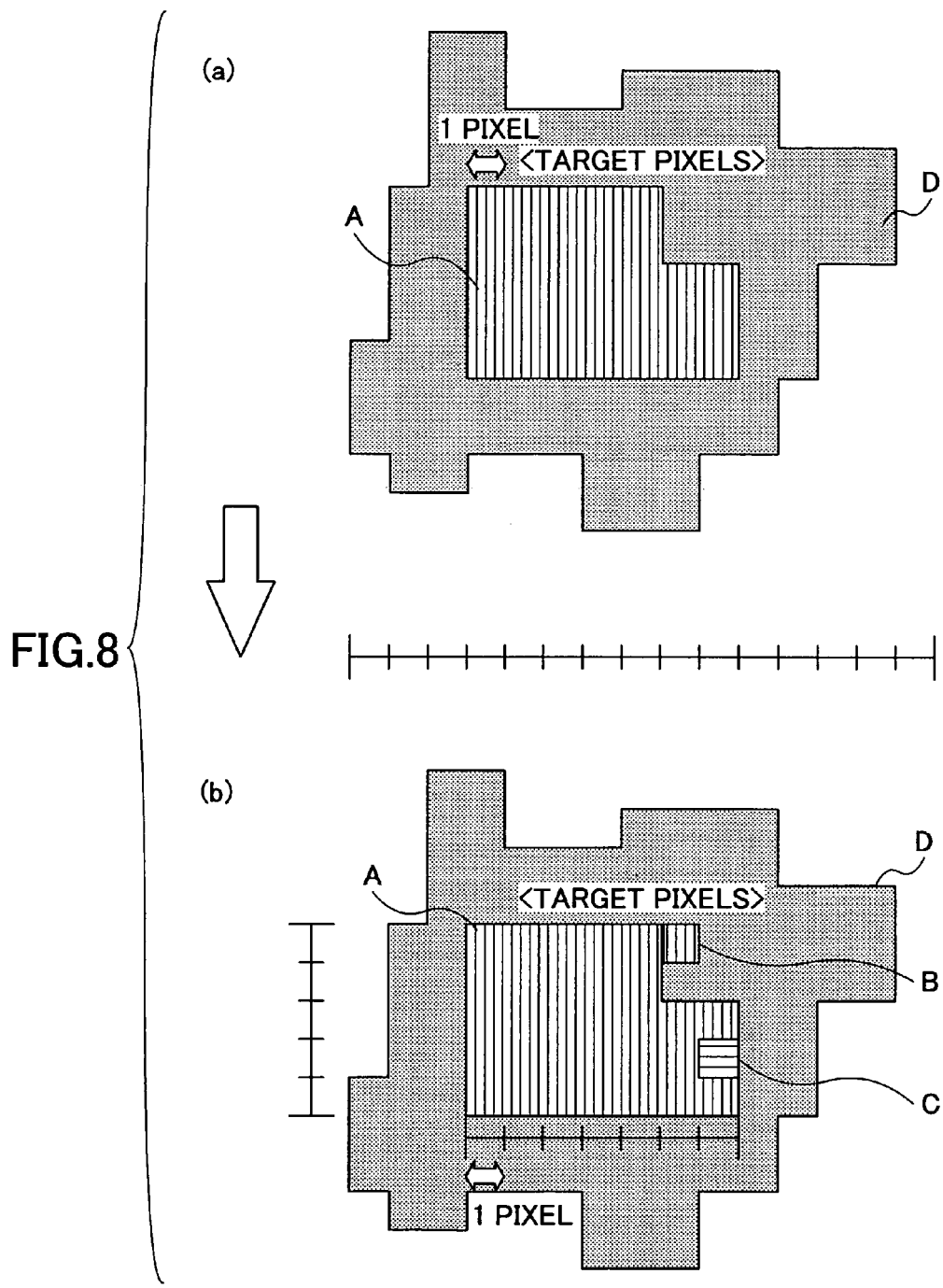
FIG. 8 is a diagram for illustrating digital watermark embedding according to a fifth embodiment.

FIG. 8 is a diagram for illustrating digital watermark embedding according to a fifth embodiment. Referring to FIG. 8, a description is given of a method for embedding, in a target block, a pixel to be embedded while preserving topology. In FIG. 8, (a) represents an original image, and (b) represents the image embedding therein a digital watermark.

In the original image (a) of FIG. 8, D indicates a block formed by pixels of an identical color, and A indicates a region that is in the block D and is formed by pixels in which a digital watermark is to be embedded. In the image (b) of FIG. 8, B indicates a pixel (one pixel) having a color the same as that of the region A and added when embedding the digital watermark, and C indicates that a pixel (one pixel) having a color the same as that of the region A is deleted when embedding the digital watermark and the deleted pixel is replaced by a pixel of the block D.

It should be noted that, in the above-mentioned case, if the pixel B contacts the outline of the block D when embedding the pixel B, the topology is not preserved, and the process is determined to be invalid. However, if the pixel B contacts the outline of the block D when embedding the pixel B, in order to preserve the topology, the outline of the block D may be moved (changed) such that the outline does not contact the pixel B.

Figure 9:
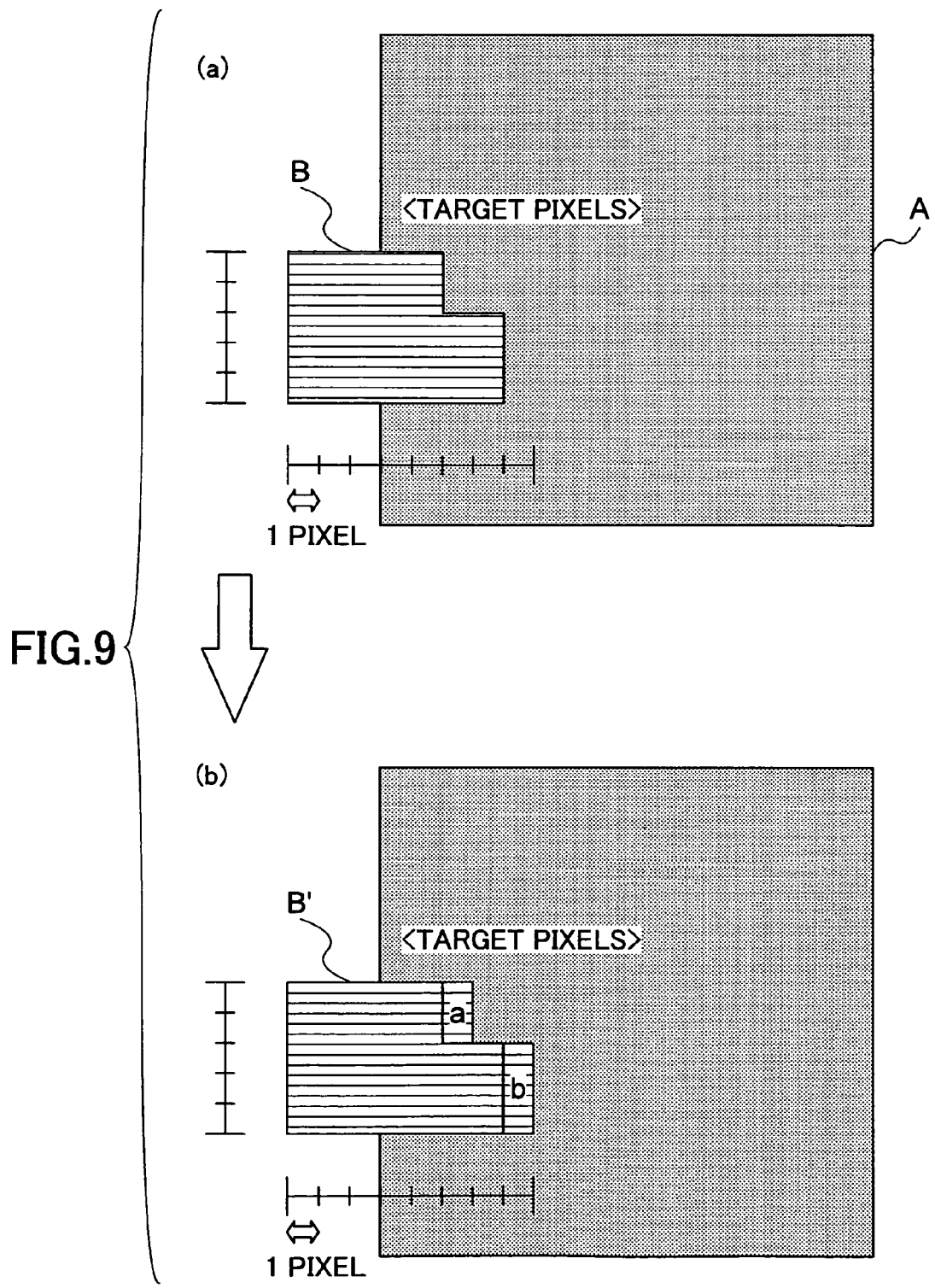
FIG. 9 is a diagram for illustrating digital watermark embedding according to a sixth embodiment.

FIG. 9 is a diagram for illustrating digital watermark embedding according to a sixth embodiment. Referring to FIG. 9, a description is given of a method for embedding a digital watermark without changing the shape of a region in which the digital watermark is to be embedded so as to prevent image quality degradation. In FIG. 9, (a) represents an original image, and (b) represents the image embedding therein a digital watermark.

In the original image (a) of FIG. 9, A indicates a block in which a digital watermark is to be embedded, and B indicates a region of pixels in which the digital watermark is to be embedded. The region B has a stair-like shape. Referring to the image (b) of FIG. 9, each run-length of the region B is extended for one pixel to form a region B', and the digital watermark is embedded as regions a and b. Accordingly, the shape of the region B of the original image (a) and that of the region B' of the image (b) are similar. Thus, image quality degradation is not likely to be noticeable. For example, in the case where a digital watermark is embedded only in the region a, the shape (concavity and convexity) of the region B and that of the region B' are different (not similar), which causes degradation of image quality.

Figure 10:
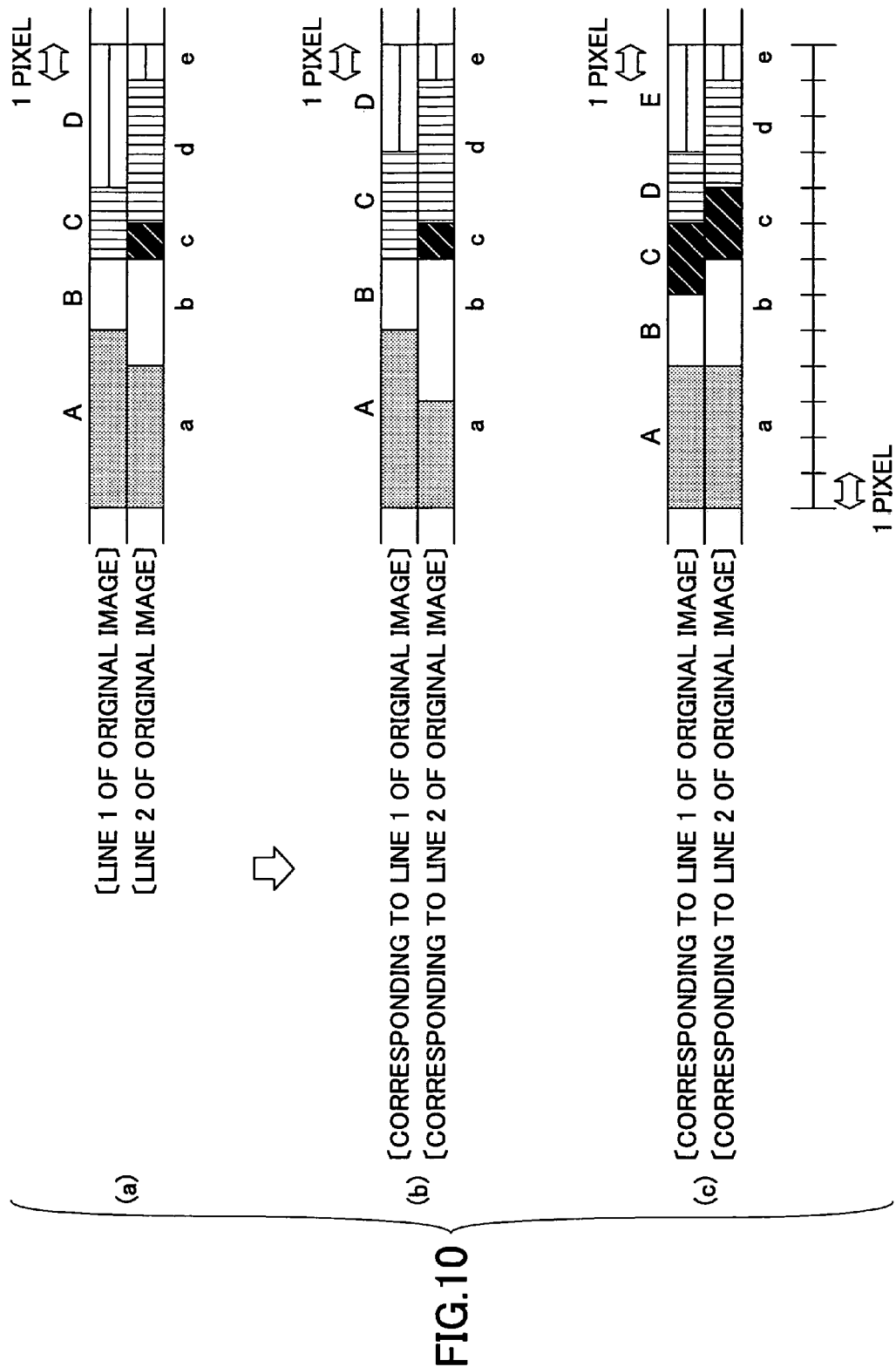
FIG. 10 is a diagram for illustrating digital watermark embedding according to a seventh embodiment.

FIG. 10 is a diagram for illustrating digital watermark embedding according to a seventh embodiment. Referring to FIG. 10, a description is given of a second method for embedding a digital watermark without changing the shape of a region in which the digital watermark is to be embedded so as to prevent image quality degradation.

In FIG. 10, (a) represents an original image including run-lengths of Lines 1 and 2, (b) represents the image after a valid digital watermark embedding process, and (c) represents the image after an invalid digital watermark embedding process.

Referring to (b) of FIG. 10, a run-length b of Line 2 is extended for one pixel, and a run-length C of Line 1 is extended for one pixel, thereby embedding a digital watermark. Comparing the portions embedding the digital watermark between the images (a) and (b), it is found that the characteristics of the original image (a) (differences in levels between Lines 1 and 2 (A and a, and B and b) are maintained in the image (b). More specifically, the characteristics of the original image such as horizontal lines, vertical lines (formed by, for example, the right ends of B and b), and oblique lines (formed by, for example, the right ends of A and a) are maintained in the image (b). Thus, the process is valid.

On the other hand, referring to the image (c), the difference in levels between run-lengths A and a (the oblique line formed by the right ends of A and a), which exists in the original image (a), disappears. Additionally, differences in levels that do not exist in the original image (a) are created between run-lengths B and b and run-lengths C and c. More specifically, in the image (c), a new oblique line extending from top left to bottom right, which does not exist in the original image (a), is newly formed by C and c. Thus, the characteristics of the original image (a) are lost, and the process is invalid.

Figure 11:
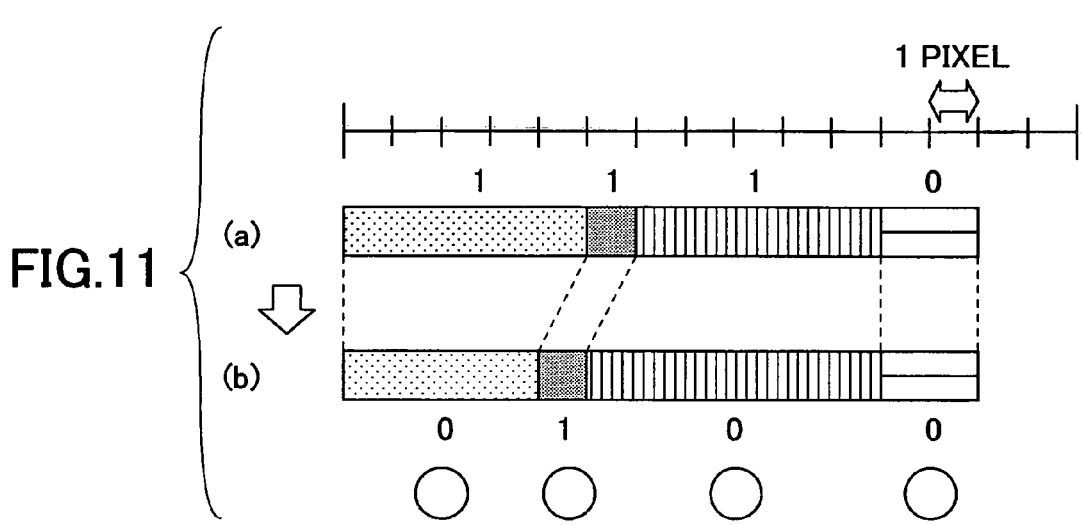
FIG. 11 is a diagram for illustrating digital watermark embedding according to an eighth embodiment.

FIG. 11 is a diagram showing digital watermark embedding according to another embodiment of the present invention. In FIG. 11, (a) represents an original image, and (b) represents the image embedding therein a digital watermark.

The pixel arrangement of the original image (a) in FIG. 11 is the same as that of the original image (a) in FIG. 4A. Thus, the alignment of run-lengths is the same ("5: odd number"→"1: odd number"→"5: odd number"→"2: even number").

Referring to FIG. 11, since information to be embedded as a digital watermark is "0100", digital watermark embedding is realized by changing the first and third run-lengths such that the run-lengths becomes "4: even number"→"1: odd number"→"6: even number"→"2: even number" so as not to delete or newly add a run-length and not to change the topology in the same line. FIG. 4A shows the case where all run-lengths are changed (from an odd-numbered value to an even-numbered value, or an even-numbered value to an odd-numbered value), while FIG. 11 shows the case where only a unit of the run-lengths is changed.

Next, referring to FIGS. 2A and 2B, a description is given of the process of embedding digital watermark information when photographing an image.

In step S1, a key input is made to determine a selection function (an input is made via, for example, a keyboard), and the input is saved in the memory for the processes as follows.

(1) Information to be embedded as a digital watermark is encrypted in advance by a secret key (e.g., password), thereby making it more difficult to read the embedded information. However, it is not always necessary to encrypt a digital watermark to be embedded. Whether to encrypt information may be selected.

(2) An input to set a block dividing method DevVar serves as an instruction to select one of the processes as follows. When DevVar=0 (rectangular) is given (YES in step S3), an image to be embedded as a digital watermark is divided into rectangular blocks (step S4). In addition, when DevVar=1 (outline of identical color may be changed) is given (NO in step S3), the image is divided into blocks surrounded by outlines of an identical color (step 5). In this case, the process proceeds to step S16 after step S15. Further, when DevVar=2 (outline of identical color cannot be changed) is given (NO in step S3), the image is divided into blocks surrounded by outlines of an identical color (step 5). In this case, the process of step S16 is not performed after step S15.

(3) An input to set BdrWM, which determines whether to perform a process dependent on the continuity between pixels in a block boundary portion, serves as an instruction to select the process subsequent to step S13. That is, when BdrWM=1 (YES in step S13), a digital watermark embedding process is performed that is dependent on the continuity between pixels of an identical color in a block boundary portion (step S14). Also, it is determined whether to change the block boundary lines formed by the outlines of an identical color. When it is necessary, the changing process is performed.

(4) An input to set SynMesh, which determines an embedding synchronization method, serves as an instruction to select the process subsequent to step S8 and the process subsequent to step S10.

(5) An input to set HarmWM, which determines whether to perform digital watermark embedding that aligns run-lengths, serves as an instruction to determine the process subsequent to step S17.

This is a selection function of whether to set the change amount (±1 or 0) of a horizontal run-length value to an identical value (a synchronized value) in the case where, in an original image, a digital watermark is to be embedded in a portion where horizontal runs, having an identical color and having an identical value for their starting points or ending points, are arranged in a vertical direction. The information amount of a digital watermark to be embedded in a portion, corresponding to a set of runs to be aligned (synchronized) is only 1 bit per such a portion. This is for reducing image quality degradation.

In step S2, a photographic object is read as a multilevel image, which serves as an original image in which a digital watermark is to be embedded, and is stored in the memory 4. The image may be a binary image.

In step S3, the subsequent process flow is determined in accordance with the block dividing method DevVar, which is set in step S1. When DevVar=0 (YES in step S3), the process proceeds to step S4, which performs division into rectangular blocks. On the other hand, when DevVar≠0 (NO in step S3), the process proceeds to step S5, which performs division into blocks having a shape other than a rectangular shape.

Step S4, division into rectangular blocks, is performed by blocks having a fixed block size that is not influenced by pixel values within the image.

In step S5, the image in which a digital watermark is to be embedded is divided into blocks having outlines of an identical color. FIG. 8 shows one of the divided blocks and a case where a digital watermark is embedded therein. A known method may be used as a block division method.

In step S6, it is determined whether the digital watermark embedding process in units of blocks has ended. If the process (steps S8 through S19) for each block has been performed on all of the blocks divided in step S4 or S5 (YES in step S6), then the process proceeds to step S7. On the other hand, if the process has not been performed on all of the blocks (NO in step S6), then the process proceeds to step S8.

Step S7 corresponds to a process after the digital watermark embedding process is completed. In step S7, the image embedding therein a digital watermark is saved as a file. The image is saved in the memory 4 or the external storage unit 3.

Step S8 is one of a process of the digital watermark embedding process, which process is to be performed on each block. In step S8, based on the embedding synchronization method SynMesh, which is set in step S1, a first identification is performed with respect to a method for embedding a digital watermark inside the block. When "to be independently performed on each line (SynMesh=0)" is selected as the embedding synchronization method (YES in step S8), the process proceeds to step S9. In other cases (NO in step S8), the process proceeds to step S10, which performs the next identification process.

In step S9, based on the fact that the embedding synchronization method is "to be independently performed on each line (SynMesh=0)", a digital watermark embedding process is performed (see FIGS. 4 and 11). In addition, by putting the limitation of FIG. 10 (illustration thereof is omitted in the flowchart), it is possible to reduce image quality degradation.

A description is given of the process flow of a process of embedding a digital watermark, which process is related to FIGS. 4 and 11.

The process procedure in the case where, for each line of an image, run-lengths are sequentially formed into digital watermark information from the left coordinate toward the right pixel runs is as follows.

Here, Law C is a law provided in order to satisfy both topology preservation law and law prohibiting change of line width of image.

A. Determine run-lengths from the leftmost run toward the right direction

B. When embedding 1 bit of digital watermark information, if the run-length of a target run in which a digital watermark is to be embedded is represented by Lt, and the run-length of the right adjacent run is represented by Lr, (A) When value (even-numbered value or odd-numbered value) of 1 bit of information to be embedded=value (even-numbered value or odd-numbered value) of Lt, Lt and Lr are not changed, (B) When value (even-numbered value or odd-numbered value) of 1 bit of information to be embedded≠value (even-numbered value or odd-numbered value) of Lt,
  a. if Lt≦Lr,
  Lt+1 and Lr−1 are performed
  b. if Lt>Lr,
  Lt−1 and Lr+1 are performed C. Lt=1 is not regarded as digital watermark information . . . . In the following case, it is represented by 1^.

A description is given of a case where, for example, information to be embedded (embedding information) as a digital watermark and the run-lengths of an original image are as follows (related portions are emphasized by underlines)
  bit alignment of embedding information:
  101110 . . . aligned in the order to be embedded
  alignment of run-lengths of original image in which digital watermark is to be embedded:
  4 1 3 1 2 3 4 2 3
  i) state of image after value of first bit of embedding information is embedded:
  3 2 3 1 2 3 4 2 3
  ii) state of image after value of second bit of embedding information is embedded: no change
  3 2 3 1 2 3 4 2 3
  iii) state of image after value of third bit of embedding information is embedded: no change
  3 2 3 1 2 3 4 2 3
  iv) state of image after value of fourth bit of embedding information is embedded:
  3 2 3 1 ^ 3 2 4 2 3
  v) state of image after value of fifth bit of embedding information is embedded:
  3 2 3 1 ^ 3 3 3 2 3
  vi) state of image after value of sixth bit of embedding information is embedded:
  3 2 3 1 ^ 3 3 2 3 3.

A description is given of a processing method for embedding a digital watermark, which processing method is related to FIG. 10.

It is assumed that the alignment of pixels in each line of an image is represented by run-lengths, and as described above with reference to FIGS. 4 and 11, a target run-length is represented by Lt, and the right adjacent run-length is represented by Lr. A digital watermark is represented by the value of Lt (whether Lt is an even-numbered value or an odd-numbered value), and Lr is used for adjustment such that (Lt+Lr)=constant is satisfied.

When this is expressed in units of pixels, in the case where the value of Lt does not match the intended bit value of a digital watermark, the value of the rightmost pixel Ite of Lt is changed to the value of the leftmost pixel Irs of Lr (of course, value of Ite≠value of Irs), or the value of the pixel Irs is changed to the value of the pixel Ite.

Pixels near the pixels Ite and Irs are represented as follows
  alignment of pixels in line above line (target line) including pixels Ite and Irs:
  Iu-, Iu0, Iu1, Iu2 . . . each representing one pixel
  alignment of pixels in target line:
  It-, Ite, Irs, Ir2 . . . each representing one pixel
  alignment of pixels in line below target line:
  Id-, Id0, Id1, Id2 . . . each representing one pixel.

Conditions satisfying FIG. 10 may be either of the following two cases based on the above-mentioned assumption.

A. In the following four cases where an edge portion within an image forms a vertical line, change cannot be made (because the vertical line of the edge portion may be damaged).
  a. when Iu1=Irs and Iu0≠Irs
  b. when Id1=Irs and Id0≠Irs
  c. when Iu0=Ite and Iu1≠Ite
  d. when Id0=Ite and Id1≠Ite B. In the following eight cases where an edge portion within an image has a stair-like shape, change may be made (because the stair-like shape of the edge portion can be maintained).

(A) Case where stair-like shape is formed from top right toward bottom left
  a. when value of Ite is changed to value of Irs (It-=Ite should be assumed)
    (a) when Ite=Iue-=Iu0=Iu1 and Ite≠Id- and Ite≠Id0
    (b) when Irs=Id-=Id0=Id1 and Irs≠Iu0 and Irs≠Iu1
  b. when value of Irs is changed to value of Ite (Irs=Ir2 should be assumed)
    (a) when Ite=Iu0=Iu1=Iu2 and Ite≠Id0 and Ite≠Id1
    (b) when Irs=Id0=Id1=Id2 and Irs≠Iu1 and Irs≠Iu2

(B) Case where stair-like shape is formed from top left toward bottom right
  a. when value of Ite is changed to value of Irs (It-=Ite should be assumed)
    (a) when Ite=Id-=Id0=Id1 and Ite≠Iu and Ite≠Iu0
    (b) when Irs=Iu-=Iu0=Iu1 and Irs≠Id0 and Irs≠Id1
  b. when value of Irs is changed to value of Ite (Irs=Ir2 should be assumed)
    (a) when Ite=Id0=Id1=Id2 and Ite≠Iu0 and Ite≠Iu1
    (b) when Irs=Iu0=Iu1=Iu2 and Irs≠Id1 and Irs≠Id2

Step S10 is a process of the digital watermark embedding process, which process is performed for each block. In step S10, based on the embedding synchronization method Syn-Mesh, which is set in step S1, the following identification is performed with respect to the digital watermark embedding method for the block. When "to be performed depending on pixel value states of adjacent lines (line above target line and line below target line) (SynMesh=1)" is selected for the embedding synchronization method (YES in step S10), the process proceeds to step S11. On the other hand, in the other cases (NO in step S10), it is assumed that "to be performed depending on continuity between pixels having an identical value in a two-dimensional plane (SynMesh=2)" is selected as the embedding synchronization method, and the process proceeds to step S12.

In step S11, a digital watermark embedding process is performed based on the fact that the embedding synchronization method is "to be performed depending on states of pixel values in adjacent lines (line above target line and line below target line) (SynMesh=1)" (see FIG. 6). In addition, by putting the limitation of FIG. 10 (illustration thereof is omitted in the flowchart), it is possible to reduce image quality degradation.

A description is given of a processing method for embedding a digital watermark, which processing method is related to FIG. 6.

It is assumed that the alignment of pixels in each line of an image is represented by run-lengths, and as described above with respect to step S9, a target run-length is represented by Lt, and the right adjacent run-length is represented by Lr. A digital watermark is represented by the value of Lt (whether Lt is an even-numbered value or an odd-numbered value), and Lr is used for adjustment such that (Lt+Lr)=constant is satisfied.

When this is expressed in units of pixels, in the case where the value of Lt does not match the intended bit value of a digital watermark, the value of the rightmost pixel Ite of Lt is changed to the value of the leftmost pixel Irs of Lr (of course, value of Ite≠value of Irs), or the value of the pixel Irs is changed to the value of the pixel Ite.

Pixels near the pixels Ite and Irs are represented as follows
alignment of pixels in line above line (target line) including pixels Ite and Irs:
Iu-, Iu0, Iu1, Iu2 . . . each representing one pixel
alignment of pixels in target line:
. . . Ite, Irs . . . each representing one pixel
alignment of pixels in line below target line:
Id-, Id0, Id1, Id2 . . . each representing one pixel.

Conditions satisfying FIG. 6 may be either of the following two cases based on the above-mentioned assumption.

A. As for whether Lt−1 and Lr+1 can be performed (whether value of Ite can be changed to value of Irs), this cannot be performed under the following conditions.
Lt≦1
or (Iu0=Ite and Iu-≠Ite)
or (Id0=Ite and Id-≠Ite)
or (Iu0=Irs and Iu1≠Irs)
or (Id0=Irs and Id1≠Irs)

B. As for whether Lt+1 and Lr−1 can be performed (whether value of Irs can be changed to value of Ite), this cannot be performed under the following conditions.
Lr≦1
or (Iu1=Ite and Iu0≠Ite)
or (Id1=Ite and Id0≠Ite)
or (Iu1=Irs and Iu2≠Irs)
or (Id1=Irs and Id2≠Irs)

In step S12, a digital watermark embedding process is performed based on the fact that the embedding synchronization method is "to be performed depending on continuity between pixels having an identical value in a two-dimensional plane (SynMesh=2)" (see FIG. 7).

A description is given of a processing method for embedding a digital watermark, which processing method is related to FIG. 7.

It is assumed that the alignment of pixels in each line of an image is represented by run-lengths, and as described above with respect to step S9, a target run-length is represented by Lt, and the right adjacent run-length is represented by Lr. A digital watermark is represented by the value of Lt (whether Lt is an even-numbered value or an odd-numbered value), and Lr is used for adjustment such that (Lt+Lr)=constant is satisfied.

When this is expressed in units of pixels, in the case where the value of Lt does not match the intended bit value of a digital watermark, the value of the rightmost pixel Ite of Lt is changed to the value of the leftmost pixel Irs of Lr (of course, value of Ite≠value of Irs), or the value of the pixel Irs is changed to the value of the pixel Ite.

Pixels near the pixels Ite and frs are represented as follows
alignment of pixels in line above line (target line) including pixels Ite and Irs:
Iu-, Iu0, Iu1, Iu2 . . . each representing one pixel
alignment of pixels in target line:
It-, Ite, Irs, Ir2 . . . each representing one pixel
alignment of pixels in line below target line:
Id-, Id0, Id1, Id2 . . . each representing one pixel.

Based on the above-mentioned assumption, considering those conditions that satisfy FIG. 7 depending on whether Lt−1 and Lr+1 can be performed (whether value of Ite can be changed to value of Irs), in the following five cases, it is determined that such a change cannot be performed.

A. When It-≠Ite, in any of the following cases
  (A) when value of Ite is different from values of four adjacent pixels (Iu0, It-, Id0 and Irs)
  (B) when Iu0=Ite=Id0
B. When It-=Ite, in any of the following cases
  (A) Iu0=Ite and Iu-≠Ite
  (B) Id0=Ite and Id-≠Ite
C. When Iu1≠Irs, when Iu0=Irs
D. When Id1≠Irs, when Id0=Irs
E. When It-=Irs, when neither of the following conditions are satisfied
  (A) Irs=Iu1=Iu0=Iu-
  (B) Irs=Idl=Id0=Id- In step S13, subsequent to the process for embedding the digital watermark inside the block performed in the above-mentioned steps S9 through S12, based on BdrWM, which is set in step S1, it is determined whether to perform a digital watermark embedding process dependent on the continuity of pixels having an identical color in a block boundary portion in a digital watermark embedding process for block boundary portions, which are formed by the adjacent blocks. When "YES (BdrWM=1)" is selected as an identifier that indicates whether to perform by depending on the continuity of pixels in the block boundary portions (YES in step S13), the process proceeds to step S14. On the other hand, in the other cases (NO in step S13), the process proceeds to step S17.

In step S14, a digital watermark embedding process is performed on block boundary portions based on the fact that the identifier, which indicates whether to perform by depending on the continuity of pixels in the block boundary portions, is "YES (BdrWM=1)" (see FIG. 5).

In step S15, in the case where the block division is performed by using the outlines of an identical color, it is determined based on DevVar, which is set in step S1, whether block boundary lines can be changed. When "outlines of identical color can be changed (DevVar=1)" is selected as to whether the outlines of an identical color can be changed, the process proceeds to step S16. On the other hand, in the other cases, the process proceeds to a determination process in step S17.

Step S16 is performed only when the block division method is carried out by using the outlines of an identical color. In the case where a block boundary line cannot be formed by an outline of an identical color (invaded by a run having a different pixel value inside the block) due to embedding of a digital watermark (extension of a run) by a pixel value that is different from the value of a pixel in a block outline portion inside the block, in order to maintain the outline of the identical color even after the digital watermark is embedded, a change is made that expands (extends) pixels having an identical color in the outline portion toward outside of the block (see FIG. 8).

In step S17, based on HamWM, which is set in step S1, it is determined whether to perform digital watermark embedding that aligns run-lengths (extends each of the run-lengths for the same amount as shown in FIG. 9) in a direction perpendicular to lines. When "YES (HamWM=1)" is selected as to whether to perform digital watermark embedding that aligns the run-lengths (YES in step S17), the process proceeds to step S18. On the other hand, in the other cases (NO in step S17), the process proceeds to step S19.

In step S18, based on the fact that "YES (HamWM=1)" is selected as to whether to perform digital watermark embedding that aligns the run-lengths (extends each of the run-lengths for the same amount as shown in FIG. 9), a digital watermark embedding process is performed that aligns consecutive horizontal runs arranged in a direction perpendicular to lines (in the case where the horizontal coordinates of the starting points or ending points of horizontal runs of an original image have an identical value, the coordinates are maintained as they are: parallel shift)(see FIG. 9).

In step S19, assuming that the target block has been processed, the next target block in which a digital watermark is to be embedded is selected, and the process proceeds to the determination process of step S6.

Next, referring to FIGS. 3A and 3B, a description is given of a digital watermark information extraction process at the time of image reproduction. The digital watermark extraction process performed at the time of image reproduction includes a lot of processes the same as those of the digital watermark embedding process at the time of image photographing. They are different in the following aspect. That is, in the digital watermark embedding process, in order to make digital watermark information effective, an original image is modified. On the other hand, in the digital watermark extracting process, embedded digital watermark information is extracted by analyzing an image without modifying the image to be read. Thus, in the digital watermark embedding process (FIGS. 2A and 2B), the options for DevVar include the function that "outline of identical color can be changed" as a block dividing function. However, the digital watermark extracting process (FIGS. 3A and 3B) does not include such a function.

In step S31, a key input is made to determine a selection function (an input is made via, for example, a keyboard), and the input is saved in the memory for the processes as follows.

It is necessary that the determined one of selection functions (1) through (5) be the same as that set at the time of digital watermark embedding. If they do not match, it is impossible to extract a digital watermark embedded in an image from which the digital watermark is to be extracted. However, as for "the block dividing method DevVar", which is to be explained in the item (2), in the case where the setting at the time of digital watermark embedding is "1: outline of identical color can be changed" or "2: outline of identical color cannot be changed", by setting "1: outline of an identical color" at the time of extracting, it is regarded that the same function is selected (both match).

(1) When extracting digital watermark information from an image in which digital watermark information is embedded after being encrypted in advance by a secret key (e.g., password), the secret key is required.

(2) An input to set the block dividing method DevVar serves as an instruction to select one of the processes as follows. When an instruction of DevVar=0 (rectangular) is given, in the steps subsequent to step S33, an image from which a digital watermark is to be extracted is divided into rectangular blocks (step S34). In addition, when an instruction of DevVar=1 (outline of identical color) is given (NO in step S33), the image from which a digital watermark is to be extracted is divided into blocks surrounded by outlines of an identical color (step S35).

(3) An input-to set BdrWM, which determines whether to perform a process dependent on the continuity between pixels in a block boundary portion, serves as an instruction to select the process subsequent to step S43. That is, when BdrWM=1 (YES in step S43), a digital watermark extracting process is performed that is dependent on the continuity between pixels of an identical color in a block boundary portion (step S44). Also, it is determined whether to change the block boundary lines formed by the outlines of an identical color. When it is necessary, the changing process is performed.

(4) An input to set SynMesh, which determines the embedding synchronization method, serves as an instruction to select the process subsequent to step S38 and the process subsequent to step S40.

(5) An input to set HarmWM, which determines whether to perform digital watermark embedding that aligns run-lengths, serves as an instruction to determine the process subsequent to step S45.

This is a selection function of whether to set the change amount (±1 or 0) of a horizontal run-length value to an identical value (a synchronized value) in the case where, in an original image at the time of the digital watermark embedding process, a digital watermark is to be embedded in a portion where horizontal runs, having an identical color and having an identical value for their starting points or ending points, are arranged in a vertical direction.

In step S32, the image is read as a target image from which the digital watermark is to be extracted, and is stored in the memory. The image may be either a multilevel image or a binary image.

In step S33, the subsequent process flow is determined in accordance with the block dividing method DevVar, which is set in step S31. When DevVar=0 (YES in step S33), the process proceeds to step S34, which performs division into rectangular blocks. On the other hand, when DevVar≠0 (NO in step S33), the process proceeds to step S35, which performs division into blocks having a shape other than a rectangular shape.

Step S34, division into rectangular blocks is performed by blocks having a fixed black size that is not influenced by pixel values within the image.

In step S35, the image from which the digital watermark is to be extracted is divided into blocks having outlines of an identical color. FIG. 8 shows one of the divided blocks and a case where a digital watermark is embedded therein. A known method may be used as a block division method.

In step S36, it is determined whether the digital watermark extracting process in units of blocks has ended. If the process (steps S38 through S47) for each block has been performed on all of the blocks divided in step S34 or S35 (YES in step S36), then the process proceeds to step S37. On the other hand, if the process has not been performed on all of the blocks (NO in step S36), then the process proceeds to step S38.

Step S37 corresponds to a process after the digital watermark extracting process is completed. In step S37, the extracted digital watermark information is saved. The information is saved in the memory 4 or the external storage unit 3.

Step S38 is one of a process of the digital watermark extracting process, which process is to be performed on each block. In step S38, based on the embedding synchronization method SynMesh, which is set in step S31, a first identification is performed with respect to a method for extracting the digital watermark inside the block. When "to be independently performed on each line (SynMesh=0)" is selected as the embedding synchronization method (YES in step S38), the process proceeds to step S39. In other cases (NO in step S38), the process proceeds to step S40, which performs the next identification process.

In step S39, based on the fact that the embedding synchronization method is "to be independently performed on each line (SynMesh=0)", a digital watermark extracting process is performed (see FIGS. 4 and 11). In addition, if the limitation of FIG. 10 has been put at the time of digital watermark embedding (illustration thereof is omitted in the flowchart), it is possible to extract the digital watermark under the same limitation also at the time of extraction.

Step S40 is a process of the digital watermark extracting process, which process is performed for each block. In step S40, based on the embedding synchronization method SynMesh, which is set in step S31, the following identification is performed with respect to the method for extracting the digital watermark inside the block. When "to be performed depending on pixel value states of adjacent lines (line above target line and line below target line) (SynMesh=1)" is selected for the embedding synchronization method (YES in step S40), the process proceeds to step S41. On the other hand, in the other cases (NO in step S40), it is assumed that "to be performed depending on continuity between pixels having an identical value in a two-dimensional plane (SynMesh=2)" is selected as the embedding synchronization method, and the process proceeds to step S42.

In step S41, a digital watermark extracting process is performed based on the fact that the embedding synchronization method is "to be performed depending on states of pixel values in adjacent lines (line above target line and line below target line) (SynMesh=1)" (see FIG. 6). In addition, if the limitation of FIG. 10 has been put at the time of digital watermark embedding (illustration thereof is omitted in the flowchart), it is possible to extract the digital watermark under the same limitation also at the time of extraction.

In step S42, a digital watermark extracting process is performed based on the fact that the embedding synchronization method is "to be performed depending on continuity between pixels having an identical value in a two-dimensional plane (SynMesh=2)" (see FIG. 7).

In step S43, subsequent to the process for extracting the digital watermark inside the block performed in the above-mentioned steps S39 through S42, based on BdrWM, which is set in step S31, it is determined whether to perform a digital watermark extracting process dependent on the continuity of pixels having an identical color in a block boundary portion in a digital watermark extracting process for block boundary portions, which are formed by the adjacent blocks. When "YES (BdrWM=1)" is selected as an identifier that indicates whether to perform by depending on the continuity of pixels in the block boundary portions (YES in step S43), the process proceeds to step S44. On the other hand, in the other cases (NO in step S43), the process proceeds to step S45.

In step S44, a digital watermark extracting process is performed on block boundary portions based on the fact that the identifier, which indicates whether to perform by depending on the continuity of pixels in the block boundary portions, is "YES (BdrWM=1)" (see FIG. 5).

In step S45, based on HamWM, which is set in step S1, it is determined whether to assume that the digital watermark embedding process has been performed that aligns run-lengths (extends each of the run-lengths for the same amount as shown in FIG. 9) in a direction perpendicular to lines. When "YES (HamWM=1)" is selected as to whether the digital watermark embedding process that aligns the run-lengths is performed (YES in step S45), the process proceeds to step S46. On the other hand, in the other cases (NO in step S45), the process proceeds to step S47.

In step S46, based on the fact that "YES (HamWM=1)" is selected as to whether the digital watermark embedding process that aligns the run-lengths (extends each of the run-lengths for the same amount as shown in FIG. 9) is performed, a digital watermark extracting process is performed that aligns consecutive horizontal runs arranged in a direction perpendicular to lines (in the case where the horizontal coordinates of the starting points or ending points of horizontal runs of the original image have an identical value, the coordinates are maintained as they are: parallel shift) (a set of runs embedding the digital watermark and having the aligned run-lengths include only 1 bit of digital watermark information) (see FIG. 9).

In step S47, assuming that the target block has been processed, the next target block from which a digital watermark is to be extracted is selected, and the process proceeds to the determination process of step S36.

It should be noted that, the present invention may be achieved by providing, to a system or device, a storing medium (recording medium) recording thereon program codes of software that realizes the functions according to the above-mentioned embodiments, and reading and executing, by a computer (CPU or MPU) of the system or device, the program codes stored in the storing medium (recording medium). In this case, the program codes that are read from the storing medium realize the functions according to the above-mentioned embodiments. For example, a flexible disk, a hard disk, an optical disk, a magneto optical disk, a magnetic tape, a non-volatile memory card, or ROM may be used as the storing medium (recording medium) for supplying the program codes. The functions according to the above-mentioned embodiments are not always realized by executing the program codes that are read by the computer. Based on instructions given by the program codes, the OS (operating system) working on the computer may perform a unit or all of actual processes so as to realize the functions according to the above-mentioned embodiments. Further, after the program codes read from the storing medium are written in a function enhancement board inserted in the computer or memory provided in a function enhancement unit coupled to the computer, based on instructions given by the program codes, CPU provided in the function enhancement board or function enhancement unit may perform a unit or all of the actual processes so as to realize the functions according to the above-mentioned embodiments.

The present invention is not limited to the specifically disclosed embodiments, and variations and modifications may be made without departing from the scope of the present invention.

The present application is based on Japanese Priority Applications No. 2004-041022 filed on Feb. 18, 2004 and No. 2005-027807 filed on Feb. 3, 2005, the entire contents of which are hereby incorporated by reference.

What is claimed is:

1. An image processing method comprising:
dividing digital content into run-lengths each including one or more consecutive pixels having an identical color using a processor;
dividing the digital content into blocks using the processor;
realizing a unique topology preserving function for each of the blocks,
wherein the unique topology preserving function prohibits a run-length from being divided, prohibits the formation of a nested run-length, and prohibits the deletion of a run-length; and embedding digital watermark information in adjacent run-lengths of the digital content by changing the run-lengths, while saving topology according to a first topology preservation law and a fourth topology preservation law using the processor, said adjacent run-lengths being stacked on one another, said digital watermark information being expressed by one of an odd-numbered value and an even-numbered value of each of the run-lengths, wherein each of the odd-numbered value and the even-numbered value is assigned to a length of a run-length, wherein the first topology preservation law is a law that does not allow division of the run-lengths by inserting, into the run-lengths, one or more pixels having a color different from colors of the run-lengths and that does not delete the run-lengths, wherein the fourth topology preservation law is a law that does not allow division of the run-lengths by newly inserting one or more pixels having a different color in at least one of a horizontal direction and a vertical direction and that does not delete the run-lengths.

2. The image processing method as claimed in claim 1, further comprising when the run-lengths exist in boundary portions of the divided blocks, embedding digital watermark information in the run-lengths by changing the run-lengths, while saving topology according to a second topology preservation law, wherein the second topology preservation law is a law that, when the run-lengths cross one or more of the boundary portions of the divided blocks, does not allow validity of continuity between the run-lengths in said boundary portions, so that the continuity of a vertical or horizontal run-length crossing one or more of the boundary portions is broken.

3. The image processing method as claimed in claim 1, further comprising when the run-lengths exist in boundary portions of the divided blocks, embedding the digital watermark information in the run-lengths by changing the run-lengths, while saving topology according to a third topology preservation law wherein the third topology preservation law is a law that, when the run-lengths cross one or more of the boundary portions of the divided blocks, allows validity of continuity between the run-lengths in said boundary portions, so that the continuity of a vertical or horizontal run-length crossing one or more of the boundary portions is not broken.

4. The image processing method as claimed in claim 1, further comprising, when embedding the digital watermark information in the adjacent run-lengths by changing the run-lengths, embedding characteristics of an original image so that the characteristics are saved.

5. The image processing method as claimed in claim 4, wherein embedding the characteristics of the original image, includes saving a vertical line formed by the adjacent run-lengths.

6. The image processing method as claimed in claim 4, wherein embedding the characteristics of the original image, includes saving a stair-like shape formed by the adjacent run-lengths.

7. The image processing method as claimed in claim 1, further comprising:

extracting the digital watermark information from an image in which the digital watermark information is embedded in the embedding.

8. The image processing method as claimed in claim 1, further comprising:

embedding, in a pixel region that is a target into which a digital watermark is to be embedded and exists in a divided block region formed by one or more pixels of an identical color such that the pixel region is surrounded by pixels of an identical color, digital watermark information without changing a border line of the block region and while saving topology; so that the new run-length is not added and a run-length is not deleted.

9. The image processing method as claimed in claim 8, further comprising:

extracting the digital watermark information from an image in which the digital watermark information is embedded in the step of embedding.

10. The image processing method as claimed in claim 1, further comprising:

embedding, in a pixel region that is a target into which a digital watermark is to be embedded and exists in a divided block region formed by one or more pixels of an identical color such that the pixel region is surrounded by pixels of an identical color, digital watermark information by allowing a change of a border line of the block region and while saving topology, so that a new run-length is not added and a run-length is not deleted.

11. The image processing method as claimed in claim 10, further comprising:

extracting the digital watermark information from an image in which the digital watermark information is embedded in the step of embedding.

12. The image processing method as claimed in claim 1, further comprising:

when embedding, in a pixel region that is a target into which a digital watermark is to be embedded and exists in a divided block region formed by one or more pixels of an identical color such that the pixel region is surrounded by pixels of an identical color, digital watermark information while saving topology so that adding a new run-length is not added and a run-length is not deleted, embedding the digital watermark information such that a shape of the region after the embedding becomes similar to the shape of the region before the embedding.

13. The image processing method as claimed in claim 12, further comprising:

extracting the digital watermark information from an image in which the digital watermark information is embedded in the step of embedding.

14. An image processing apparatus realized using a processor comprising:

a dividing unit on the processor that divides digital content into run-lengths each including one or more consecutive pixels having an identical color and divides the digital content into blocks;

a realizing unit on the processor that realizes a unique topology preserving function for each of the blocks, wherein the unique topology preserving function prohibits a run-length from being divided, prohibits the formation of a nested run-length, and prohibits the deletion of a run-length; and a digital watermark embedding unit on the processor that embeds digital watermark information in adjacent run-lengths of the digital content by changing the run-lengths, while saving topology according to a first topology preservation law and a fourth topology preservation law, said adjacent run-lengths being stacked on one another, said digital watermark information being expressed by one of an odd-numbered value and an even-numbered value of each of the run-lengths, wherein each of the odd-numbered value and the even-numbered value is assigned to a length of a run-length, wherein the first topology preservation law is a law that does not allow division of the run-lengths by inserting, into the run-lengths, one or more pixels having a color different from colors of the run-lengths and that does not delete the run-lengths, wherein the fourth topology preservation law is a law that does not allow division of the run-lengths by newly inserting one or more pixels having a different color in at least one of a horizontal direction and a vertical direction and that does not delete the run-lengths.

15. The image processing apparatus as claimed in claim 14, wherein the embedding unit, when the run-lengths exist in boundary portions of the divided blocks, embeds the digital watermark information in the run-lengths by changing the run-lengths, while saving topology according to a second topology preservation law, wherein the second topology preservation law is a law that, when the run-lengths cross one or more of the boundary portions of the divided blocks, does not allow validity of continuity between the run-lengths in said boundary portions, so that the continuity of a vertical or horizontal run-length crossing one or more of the boundary portions is broken.

16. The image processing apparatus as claimed in claim 14, wherein the embedding unit, when the run-lengths exist in boundary portions of the divided blocks, embeds the digital watermark information in the run-lengths by changing the run-lengths, while saving topology according to a third topology preservation law, wherein the third topology preservation law is a law that, when the run-lengths cross one or more of the boundary portions of the divided blocks, allows validity of continuity between the run-lengths in said boundary portions, so that the continuity of a vertical or horizontal run-length crossing one or more of the boundary portions is not broken.

17. The image processing apparatus as claimed in claim 14, wherein the embedding unit, when embedding the digital watermark information in the adjacent run-lengths by changing the run-lengths while saving topology, embeds characteristics of an original image so that the characteristics are saved.

18. The image processing apparatus as claimed in claim 17, wherein the embedding unit embeds a vertical line formed by the adjacent run-lengths such that said vertical line is saved.

19. The image processing apparatus as claimed in claim 17, wherein the embedding unit embeds a stair-like shape formed by the adjacent run-lengths such the said stair-like shape is saved.

20. The image processing apparatus as claimed in claim 14, further comprising:

an extracting unit that extracts the digital watermark information from an image in which the digital watermark information is embedded by the embedding unit.

21. The image processing apparatus as claimed in claim 14, wherein the embedding unit embeds, in a pixel region that is a target into which a digital watermark is to be embedded and exists in a divided block region formed by one or more pixels of an identical color such that the pixel region is surrounded by pixels of an identical color, digital watermark information without changing a border line of the block region and while saving topology, so that a new run-length is not added and a run-length is not deleted.

22. The image processing apparatus as claimed in claim 21, further comprising:

an extracting unit that extracts the digital watermark information from an image in which the digital watermark information is embedded by the embedding unit.

23. The image processing apparatus as claimed in claim 21, wherein the embedding unit embeds, in a pixel region that is a target into which a digital watermark is to be embedded and exists in a divided block region formed by one or more pixels of an identical color such that the pixel region is surrounded by pixels of an identical color, digital watermark information allowing a change of a border line of the block region and while saving topology, so that a new run-length is not added and a run-length is not deleted.

24. The image processing apparatus as claimed in claim 23, further comprising:

an extracting unit that extracts the digital watermark information from an image in which the digital watermark information is embedded by the embedding unit.

25. The image processing apparatus as claimed in claim 23, wherein the embedding unit, when embedding, in a pixel region that is a target into which a digital watermark is to be embedded and exists in a divided block region formed by one or more pixels of an identical color such that the pixel region is surrounded by pixels of an identical color, digital watermark information while saving topology, so that a new run-length is not added and a run-length is not deleted, embeds the digital watermark information such that a shape of the region after the embedding saves a shape of the region before the embedding.

26. The image processing apparatus as claimed in claim 25, further comprising:

an extracting unit that extracts the digital watermark information from an image in which the digital watermark information is embedded by the embedding unit.

27. An article of manufacture having one or more computer-readable recording media A machine-readable medium storing instructions thereon which, when executed by a computer system, cause the computer system to perform a method comprising:

dividing digital content into run-lengths each including one or more consecutive pixels having an identical color;

dividing the digital content into blocks;

realizing a unique topology preserving function for each of the blocks, wherein the unique topology preserving function prohibits a run-length from being divided, prohibits the formation of a nested run-length, and prohibits the deletion of a run-length; and embedding digital watermark information in adjacent run-lengths of the digital content by changing the run-lengths, while saving topology according to a first topology preservation law and a fourth topology preservation law, said adjacent run-lengths being stacked on one another, said digital watermark information being expressed by one of an odd-numbered value and an even-numbered value of each of the run-lengths, wherein each of the odd-numbered value and the even-numbered value is assigned to a length of a run-length, wherein the first topology preservation law is a law that does not allow division of the run-lengths by inserting, into the run-lengths, one or more pixels having a color different from colors of the run-lengths and that does not delete the run-lengths, wherein the fourth topology preservation law is a law that does not allow division of the run-lengths by newly inserting one or more pixels having a different color in at least one of a horizontal direction and a vertical direction and that does not delete the run-lengths.

28. The medium article of manufacture as claimed in claim 27, further comprising instructions stored thereon that cause the computer system to perform:

when the run-lengths exist in boundary portions of the divided blocks, embedding the digital watermark information in the run-lengths by changing the run-lengths, while saving topology according to a second topology preservation law, wherein the second topology preservation law is a law that, when the run-lengths cross one or more of the boundary portions of the divided blocks, does not allow validity of continuity between the run-lengths in said boundary portions, so that the continuity of a vertical or horizontal run-length crossing one or more of the boundary portions is broken.

29. The medium article of manufacture as claimed in claim 27, further comprising instructions stored thereon that cause the computer system to perform:

when the run-lengths exist in boundary portions of the divided blocks, embedding the digital watermark information in the run-lengths by changing the run-lengths, while saving topology according to a third topology preservation law wherein the third topology preservation law is a law that, when the run-lengths cross one or more of the boundary portions of the divided blocks, allows validity of continuity between the run-lengths in said boundary portions, so that the continuity of a vertical or horizontal run-length crossing one or more of the boundary portions is not broken.

30. The medium article of manufacture as claimed in claim 27, further comprising instructions stored thereon that cause the computer system to perform:

when embedding the digital watermark information in the adjacent run-lengths by changing the run-lengths, embedding characteristics of an original image so that the characteristics are saved.

31. The medium article of manufacture as claimed in claim 30, wherein embedding the characteristics of the original image, includes saving a vertical line formed by the adjacent run-lengths.

32. The medium article of manufacture as claimed in claim 30, wherein embedding the characteristics of the original image, includes saving a stair-like shape formed by the adjacent run-lengths.

33. The medium article of manufacture as claimed in claim 27, further comprising instructions stored thereon that cause the computer system to perform:

extracting the digital watermark information from an image in which the digital watermark information is embedded in the embedding.

34. The medium article of manufacture as claimed in claim 27, further comprising instructions stored thereon that cause the computer system to perform:

embedding, in a pixel region that is a target into which a digital watermark is to be embedded and exists in a divided block region formed by one or more pixels of an identical color such that the pixel region is surrounded by pixels of an identical color, digital watermark information without changing a border line of the block region and while saving topology; so that a new run-length is not added and a run-length is not deleted.

35. The medium article of manufacture as claimed in claim 34, further comprising instructions stored thereon that cause the computer system to perform:

extracting the digital watermark information from an image in which the digital watermark information is embedded in the step of embedding.

36. The medium article of manufacture as claimed in claim 27, further comprising instructions stored thereon that cause the computer system to perform:

embedding, in a pixel region that is a target into which a digital watermark is to be embedded and exists in a divided block region formed by one or more pixels of an identical color such that the pixel region is surrounded by pixels of an identical color, digital watermark information by allowing a change of a border line of the block region and while saving topology, so that a new run-length is not added and a run-length is not deleted.

37. The medium article of manufacture as claimed in claim 36, further comprising instructions stored thereon that cause the computer system to perform:

extracting the digital watermark information from an image in which the digital watermark information is embedded in the step of embedding.

38. The medium article of manufacture as claimed in claim 27, further comprising instructions stored thereon that cause the computer system to perform:

when embedding, in a pixel region that is a target into which a digital watermark is to be embedded and exists in a divided block region formed by one or more pixels of an identical color such that the pixel region is surrounded by pixels of an identical color, digital watermark information while saving topology so that adding a new run-length is not added and a run-length is not deleted, embedding the digital watermark information such that a shape of the region after the embedding becomes similar to a shape of the region before the embedding.

39. The medium article of manufacture as claimed in claim 38, further comprising instructions stored thereon that cause the computer system to perform:

extracting the digital watermark information from an image in which the digital watermark information is embedded in the step of embedding.

* * * * *